(12) United States Patent
Bouillon et al.

(10) Patent No.: US 8,685,868 B2
(45) Date of Patent: Apr. 1, 2014

(54) REINFORCING FIBROUS STRUCTURE FOR A COMPOSITE MATERIAL AND A PART CONTAINING SAID STRUCTURE

(75) Inventors: Eric Bouillon, Le Haillan (FR); Francois Charleux, Bordeaux (FR); Dominique Coupe, Le Haillan (FR); Bruno Dambrine, Le Chatelet en Brie (FR); Jean Noel Mahieu, Paris (FR)

(73) Assignees: SNECMA, Paris (FR); SNECMA Propulsion Solide, Le Haillan (FR)

( * ) Notice: Subject to any disclaimer, the term of this patent is extended or adjusted under 35 U.S.C. 154(b) by 1597 days.

(21) Appl. No.: 11/993,647

(22) PCT Filed: Jun. 21, 2006

(86) PCT No.: PCT/FR2006/050617
§ 371 (c)(1), (2), (4) Date: Jun. 5, 2008

(87) PCT Pub. No.: WO2006/136755
PCT Pub. Date: Dec. 28, 2006

(65) Prior Publication Data
US 2010/0144227 A1    Jun. 10, 2010

(30) Foreign Application Priority Data
Jun. 24, 2005 (FR) ...................... 05 06441

(51) Int. Cl.
*D03D 11/00* (2006.01)
*D03D 3/06* (2006.01)
*B64C 11/16* (2006.01)
*B64C 27/46* (2006.01)

(52) U.S. Cl.
USPC ........ 442/205; 442/206; 442/207; 416/227 R; 416/230; 139/384 R; 139/408

(58) Field of Classification Search
USPC ............................. 139/384 R, 386, 408–415; 442/205–207; 416/227 R, 230
See application file for complete search history.

(56) References Cited

U.S. PATENT DOCUMENTS

| | | | | |
|---|---|---|---|---|
| 5,102,725 | A * | 4/1992 | Knox et al. | 442/205 |
| 5,899,241 | A * | 5/1999 | David et al. | 139/408 |
| 2003/0024590 | A1* | 2/2003 | Stone | 139/408 |
| 2005/0084377 | A1 | 4/2005 | Dambrine et al. | |
| 2006/0257260 | A1 | 11/2006 | Dambrine et al. | |

FOREIGN PATENT DOCUMENTS

| | | |
|---|---|---|
| EP | 0 439 274 | 7/1991 |
| EP | 1 526 285 | 4/2005 |
| GB | 2 299 379 | 10/1996 |

* cited by examiner

*Primary Examiner* — Jenna Johnson
(74) *Attorney, Agent, or Firm* — Oblon, Spivak, McClelland, Maier & Neustadt, L.L.P.

(57) ABSTRACT

A reinforcing fiber structure woven as a single piece for fabricating a composite material part, the fiber structure having an internal portion or core (72), and a portion adjacent to an outside surface of the structure, or skin (74, 76), and the fiber structure being formed by a three-dimensional weaving in its core using at least one weave selected from an interlock weave and a multilayer weave, and by weaving at its skin with a weave of satin type that is different from the weave in the core the weaving at the skin being of the multilayer type or of the two-dimensional type.

16 Claims, 30 Drawing Sheets

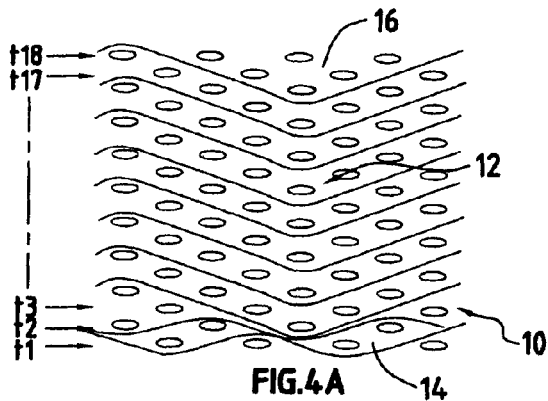
FIG.4A
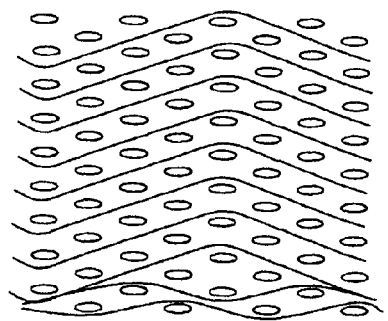
FIG.4E
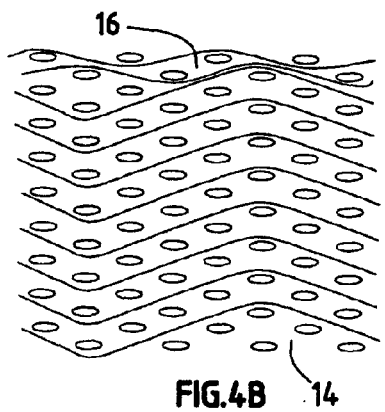
FIG.4B
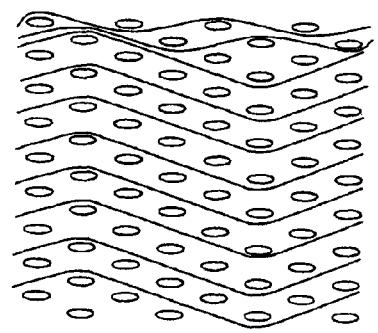
FIG.4F
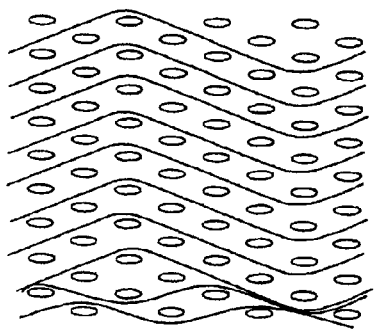
FIG.4C
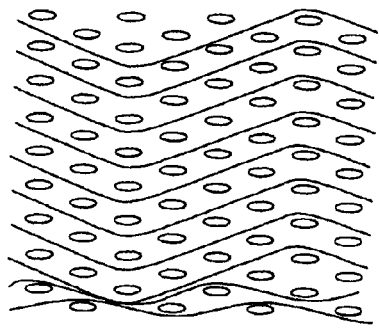
FIG.4G
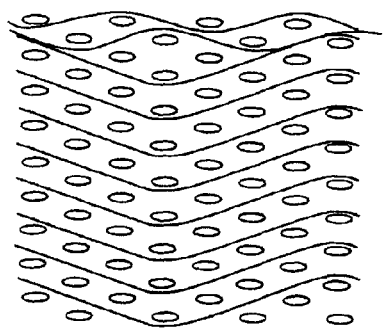
FIG.4D
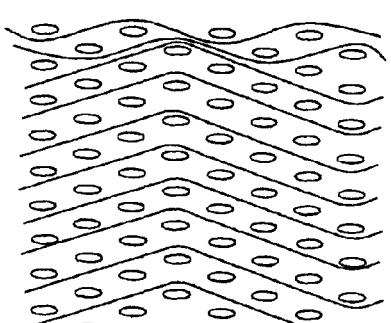
FIG.4H
FIG.4

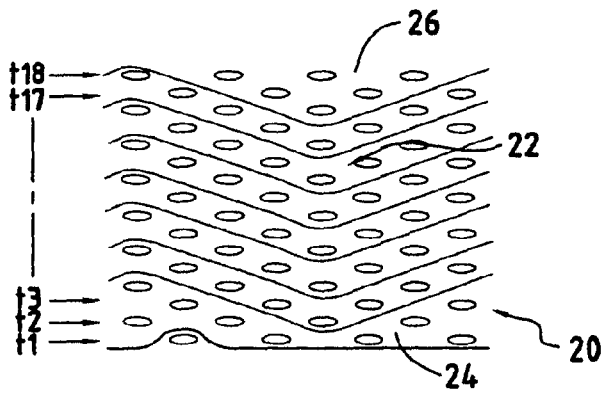
FIG.5A
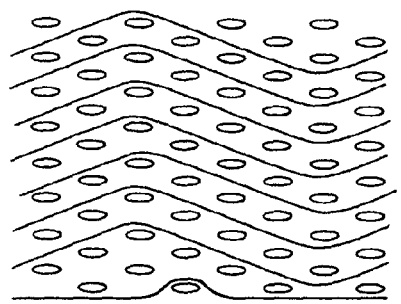
FIG.5E
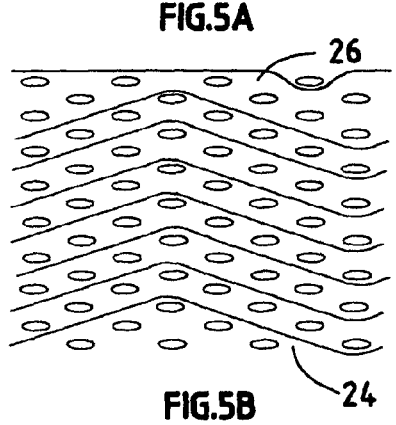
FIG.5B
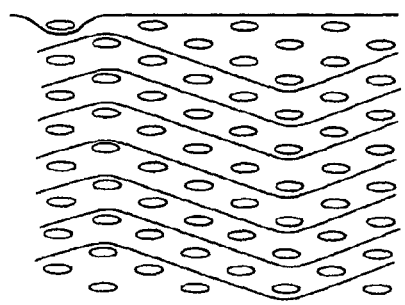
FIG.5F
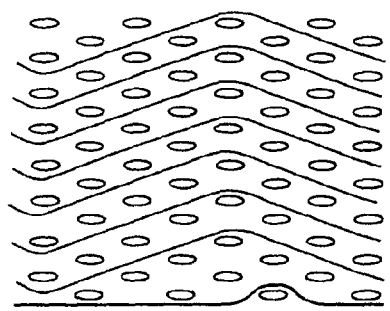
FIG.5C
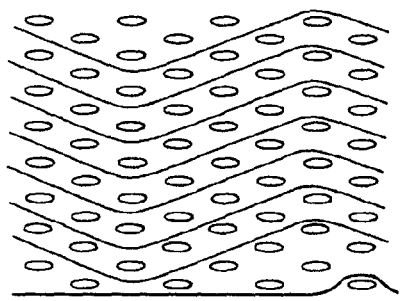
FIG.5G
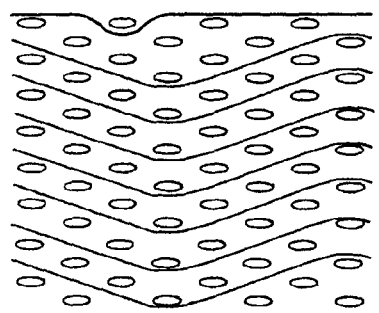
FIG.5D
FIG.5
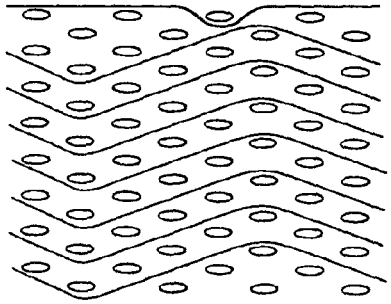
FIG.5H

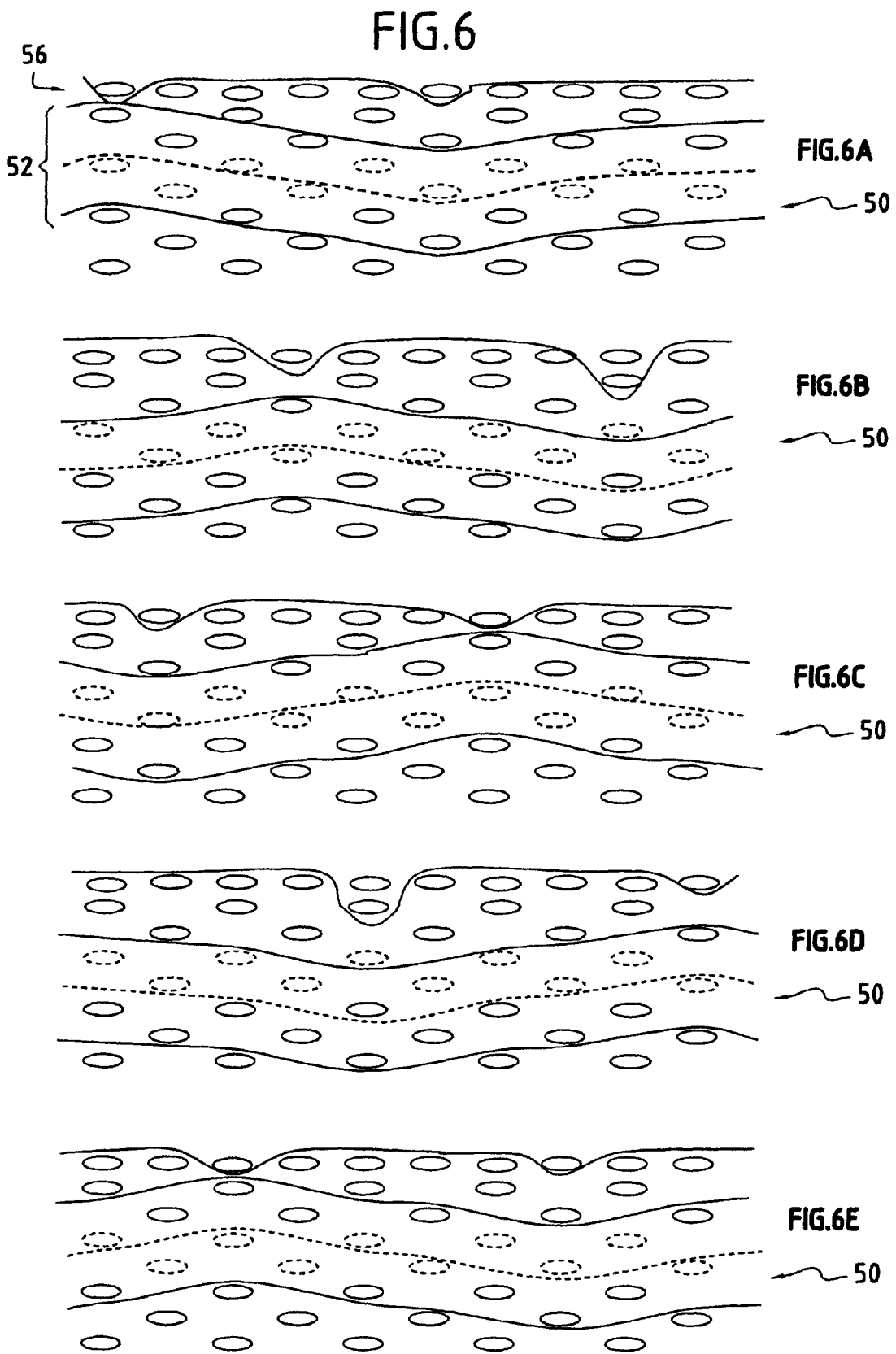

50

50

50

50

50

FIG. 7
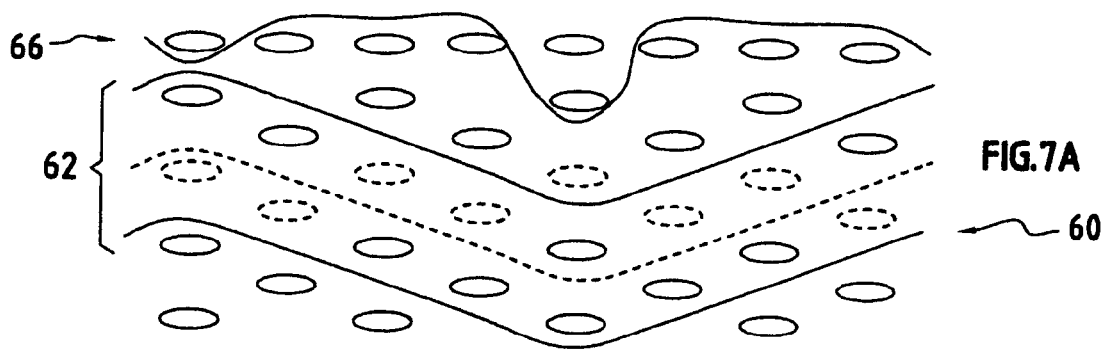
FIG. 7A
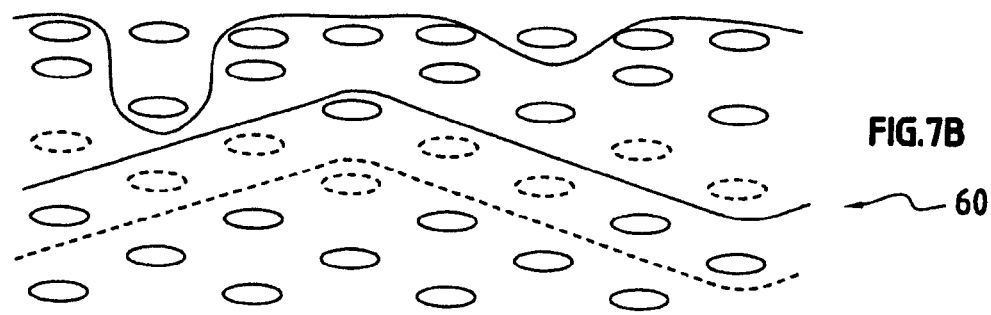
FIG. 7B
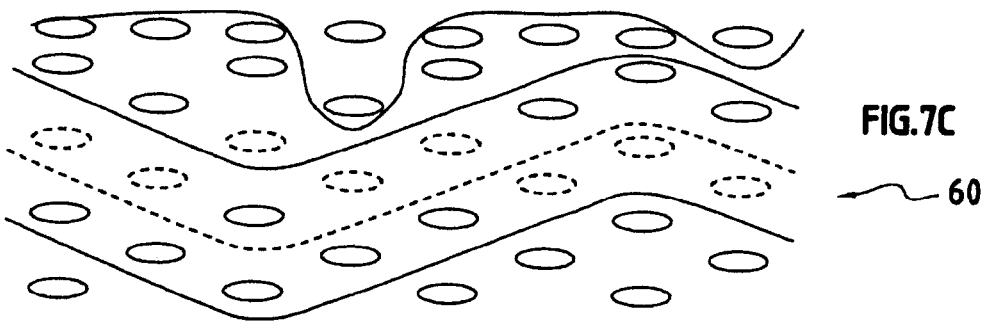
FIG. 7C
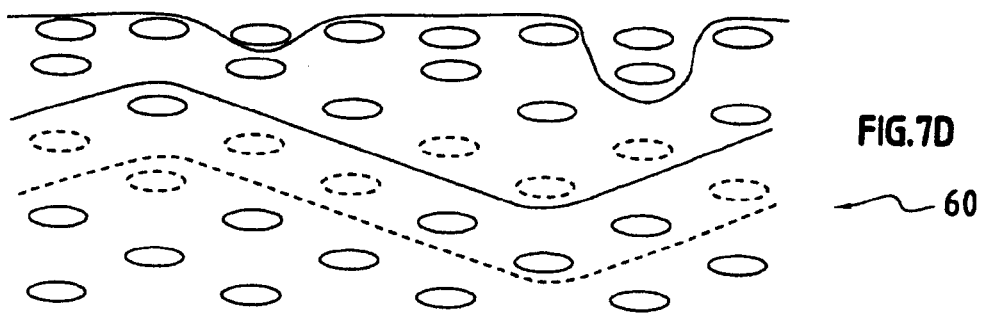
FIG. 7D FIG.8
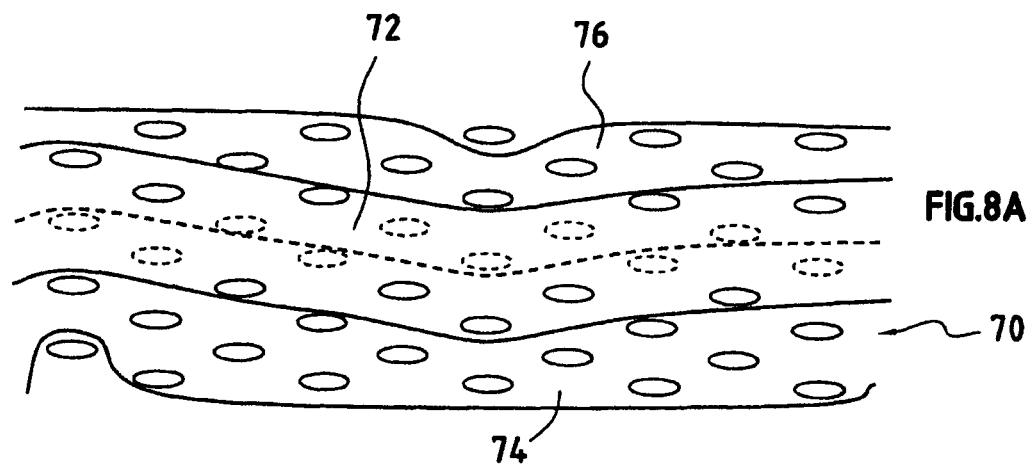
FIG.8A
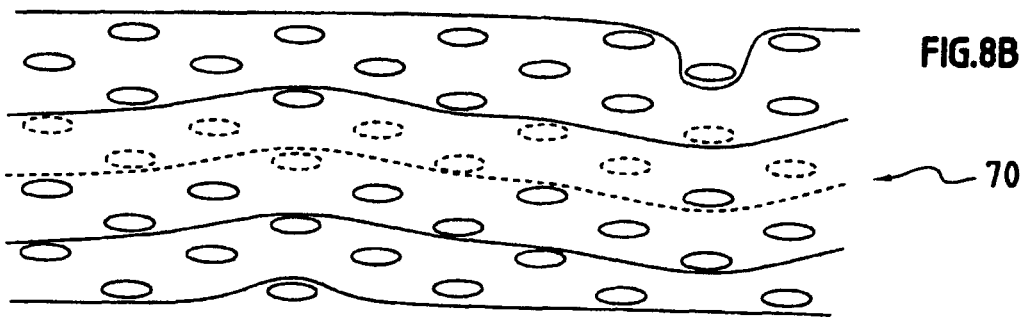
FIG.8B

92

92

92

92

92

92

FIG.10
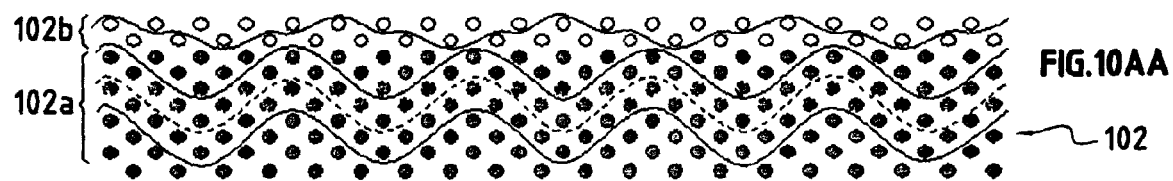
FIG.10AA
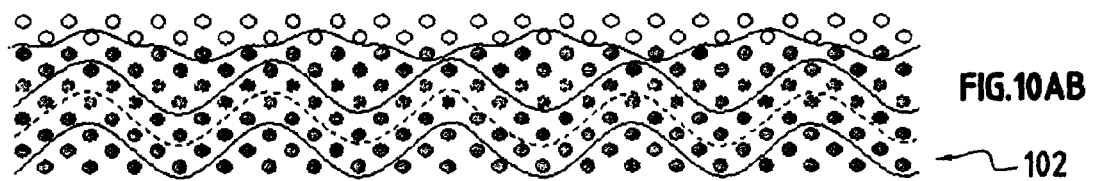
FIG.10AB

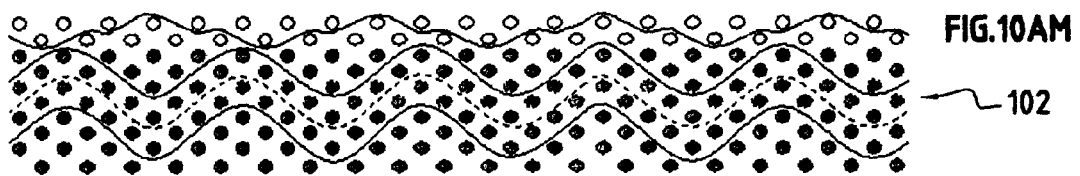
FIG.10AM — 102
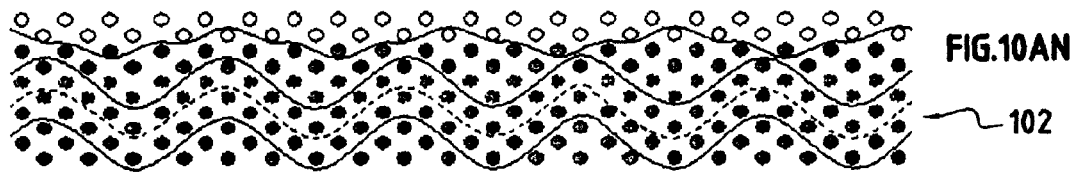
FIG.10AN — 102
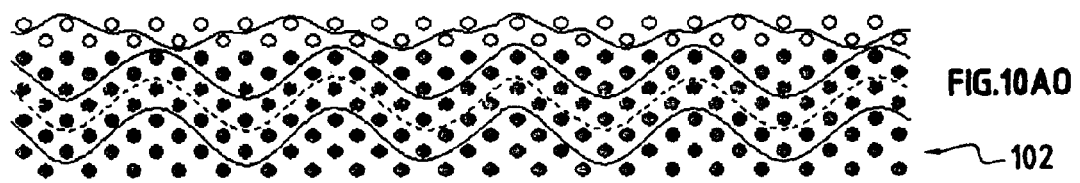
FIG.10AO — 102
FIG.10AP — 102
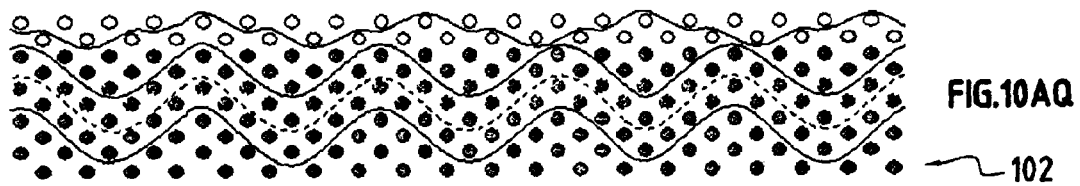
FIG.10AQ — 102

FIG.13
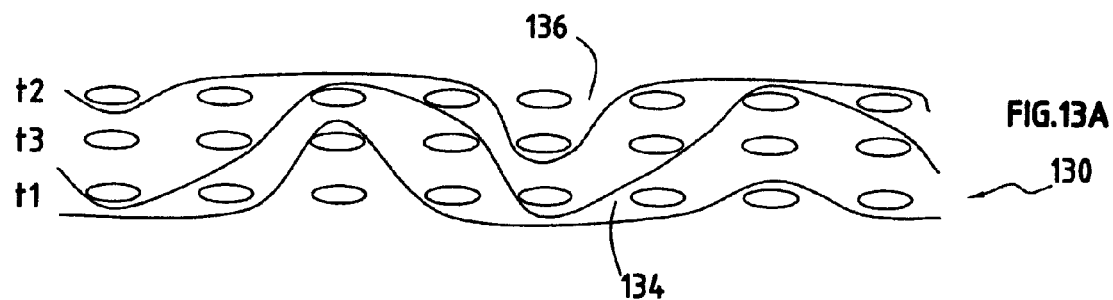
FIG.13A
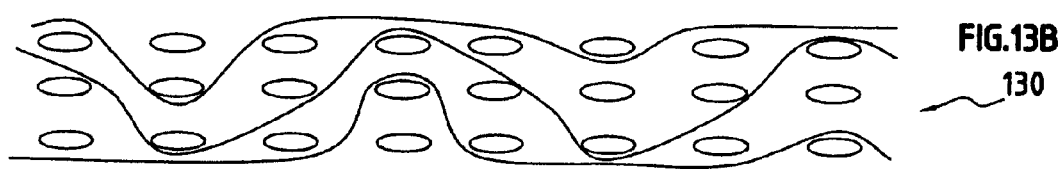
FIG.13B
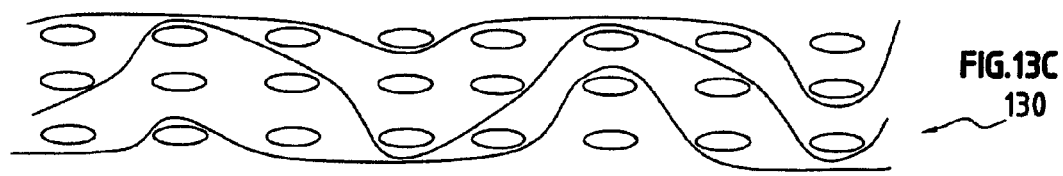
FIG.13C
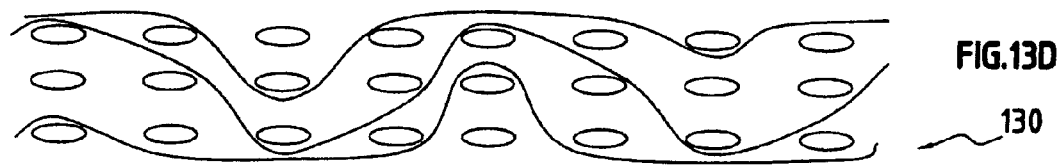
FIG.13D

FIG.14
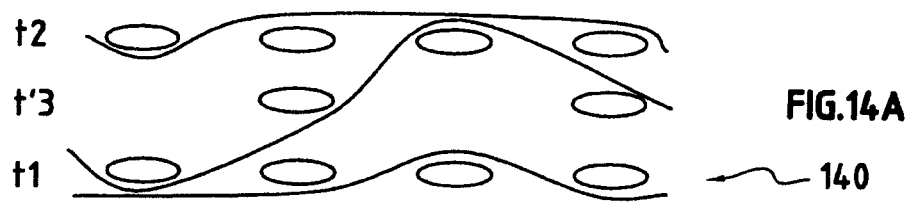
FIG.14A
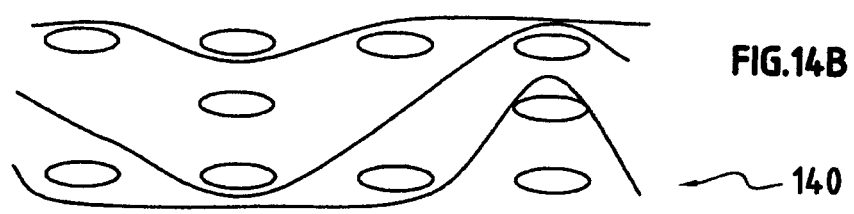
FIG.14B
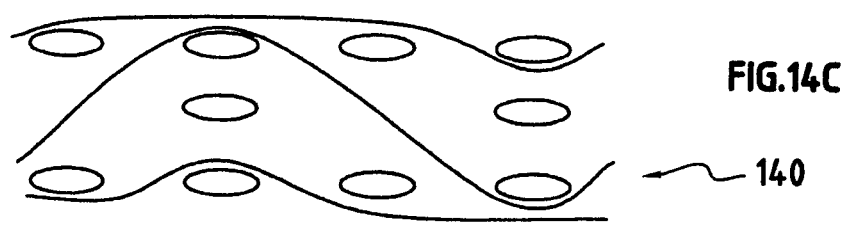
FIG.14C
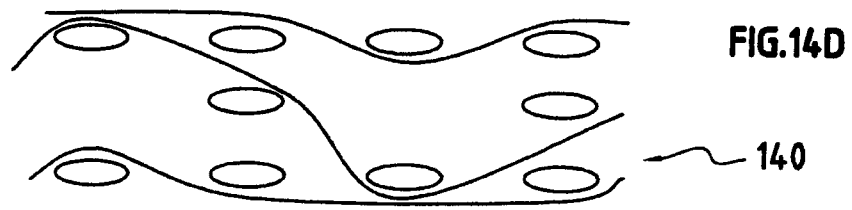
FIG.14D

FIG.15
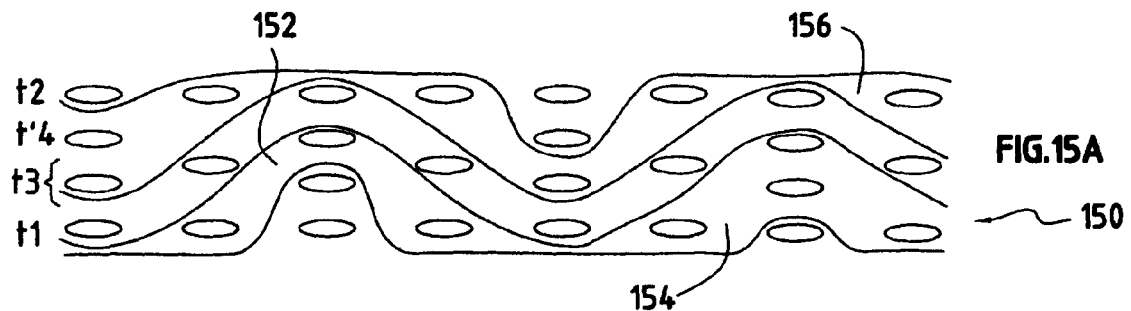
FIG.15A
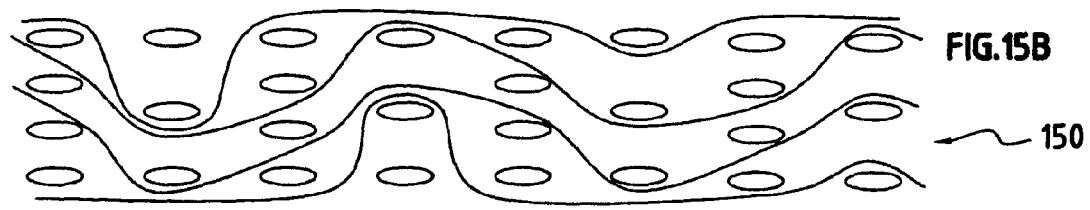
FIG.15B
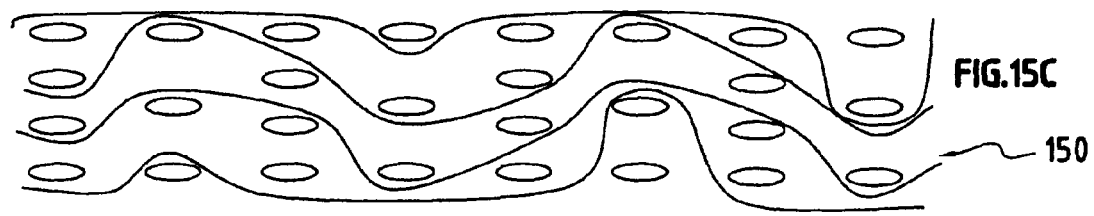
FIG.15C
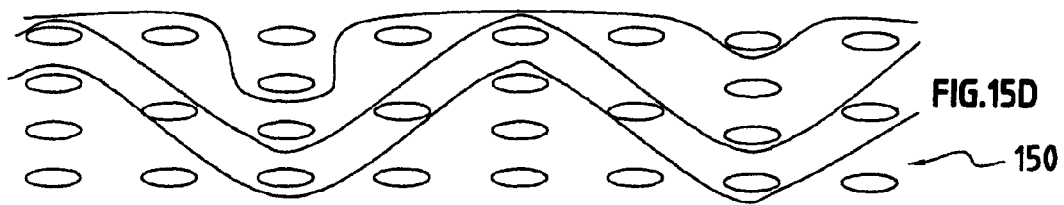
FIG.15D

REINFORCING FIBROUS STRUCTURE FOR A COMPOSITE MATERIAL AND A PART CONTAINING SAID STRUCTURE

BACKGROUND OF THE INVENTION

The invention relates to making composite material parts, and more particularly to making reinforcing fiber structures for such parts.

The field of application of the invention is making structural parts of composite material having fiber reinforcement and a resin matrix. Such parts are used in very many fields, and in particular in the field of aviation. One particular example is making blades for turbomachines, in particular fan blades. The reinforcing fiber structure is densified by a resin matrix in any known manner, for example by resin transfer molding (RTM).

Another field of application for the invention is making parts out of thermostructural composite material, i.e. a material having mechanical properties that makes it suitable for constituting structural elements and also having the ability to conserve these properties at high temperatures. Thermostructural composite materials are typically carbon/carbon (C/C) composite materials having fiber reinforcement of carbon densified by a carbon matrix, and ceramic matrix composite (CMC) materials having refractory fiber reinforcement (of carbon or ceramic) densified by a ceramic matrix. Thermostructural composite material parts are used in particular in the fields of aviation and space flight. The reinforcing fiber structure can be densified by the material that constitutes the matrix by performing chemical vapor infiltration (CVI) or by using a liquid technique, as is well known. Liquid densification consists in impregnating the fiber structure with a liquid composition containing a precursor for the material that is to constitute the matrix, typically a resin, with the precursor being transformed by heat treatment.

For composite material parts that present a certain amount of thickness, it is known to make the reinforcing fiber structure as a plurality of superposed layers that are bonded to one another so as to avoid the layers separating, in particular it is known to make a reinforcing structure by three-dimensional weaving.

Thus, document EP 1 526 285 proposes making a reinforcing structure or preform for a turbomachine blade, in particular a fan blade, by interlock type three-dimensional weaving with the weave varying in the longitudinal direction between the root and the airfoil of a blade.

Various aspects need to be taken into consideration when making reinforcing fiber structures for composite material parts.

Thus, when composite material parts need to present a smooth surface state, it is desirable to avoid the reinforcing fiber structure presenting large surface irregularities that require additional operations in order to eliminate or avoid such irregularities, such as surface trimming, e.g. after a first stage of densification or consolidation stage, or adding a two-dimensional ply on the surface, e.g. a ply of woven fabric, before the end of densification.

In addition, for composite material parts having a resin matrix, the presence of significant surface irregularities leads to the formation of localized clumping of the resin, thereby harming the mechanical properties of such parts.

Furthermore, for a composite material part that is obtained by densifying a fiber reinforcing structure by CVI, it is desirable to leave easy access for the infiltration to reach the core of the fiber structure, and to ensure that the core presents porosity that is relatively uniform so that densification presents as little non-uniformity as possible. When access to the pores within the fiber structure is difficult, or when there are pores presenting sizes that are very different, with the smaller pores becoming closed up more quickly, then a steep densification gradient is inevitable, and that affects the properties of the composite material.

Finally, with composite material parts presenting thin portions, such as, for example, the trailing edges of turbomachine blades, it is desirable to conserve a three-dimensional structure that extends into said thin portions, while preserving structural continuity with the thicker portions, so as to impart the expected mechanical properties to the parts.

OBJECT AND SUMMARY OF THE INVENTION

The invention seeks to provide a reinforcing fiber structure that is woven as a single piece, for use in fabricating a composite material part and capable of complying with at least one of the above constraints.

This object is achieved by a fiber reinforcing structure comprising an internal portion or core, and a portion adjacent to an outside surface of the structure, or skin, and the fiber structure being formed by three-dimensional weaving in its core using at least one weave selected from an interlock weave and a multilayer weave, and by weaving at its skin with a weave of satin type.

The fiber texture is always woven as a single piece, with all of the layers being bonded together by the three-dimensional weaving in the core alone or in combination with multilayer weaving at the skin.

Depending on the properties desired for the fiber structure, different combinations of weaves can be provided between the core portions and the skin.

Thus, the fiber structure may be formed by three-dimensional weaving with at least one interlock weave in the core and weaving at the skin using a satin type weave.

When the fiber structure is densified by CVI to obtain a composite material part, an interlock weave in the core ensures easier access for the infiltration to the core of the preform.

Weaving at the skin with a satin type weave serves to limit surface irregularities. When densification is performed with a resin, this avoids clumps of resin forming on the surface, of the kind that can be observed with an interlock weave such as that in above-mentioned document EP 1 526 285 for which surface irregularities are relatively large. The weaving at the skin may be a multilayer weave, or it may be a two-dimensional weave, in which case weaving with an interlock weave serves to bond the layers together and extends into a portion of the skin.

In other embodiments, the fiber structure may be formed by multilayer weaving in the core and multilayer weaving at the skin using a weave that is different from that in the core, or it may be formed by weaving with a multilayer weave in the core and a two-dimensional weave at the skin.

In another particular embodiment, the core portion may comprise a first portion formed by weaving with a first weave and at least one second portion situated between the first portion and the skin, the second portion being formed by three-dimensional weaving with a second weave different from the first.

The first and second weaves may be interlock weaves or multilayer weaves. With multilayer weaves, the first and second weaves may, for example, be multiple satin weaves at different pitches. It is also possible for one of the first and second weaves to be an interlock weave and the other to be a multilayer weave.

The kind of three-dimensional weaving in the core and at the skin can be selected as a function of the properties desired in terms of: the fiber content in the texture (apparent volume percentage of the texture actually occupied by the fibers); the permeability of the layers; the deformability of the fiber structure; and/or mechanical strength within the planes of the layers, or perpendicularly thereto.

Furthermore, at least one of the warp and weft counts can be caused to vary between the core and the skin, for example by reducing the count between the core and the skin so as to give easier access for infiltration through the skin into the core while the fiber structure is being densified by CVI.

It is also possible to vary the caliber of the yarns between the core and the skin, for example to comply with desired limits on the value for the ratio of fiber volume percentages between warp and weft and for the value of the overall fiber volume percentage.

According to one feature, the fiber structure has at least one portion of reduced thickness with two layers of weft yarns and formed by three-dimensional weaving with an interlock type weave bonding the two weft layers together, and by two-dimensional weaving with satin type weave bonding the yarns together within each weft layer.

According to another feature, the fiber structure has a portion of reduced thickness with three layers of weft yarns and formed by three-dimensional weaving with an interlock type weave bonding together the three weft layers, and the central layer of weft yarns is also bonded to each of the other two layers by multilayer weaving with satin type weave.

According to another feature, the fiber structure has a transition portion between a first portion and a second portion that has a complete layer of weft yarns that is additional compared with the first portion, the transition portion having a partial layer of weft yarns that is additional compared with the first portion. The weft yarns of the additional partial layer possibly being disposed between two complete layers of weft yarns and being bonded thereto by weaving using an interlock weave.

With these features, it is possible to provide three-dimensional weaving continuity into portions of a fiber structure that are very thin, for example the portions of fiber preforms for turbomachine blades that correspond to the trailing edges of the blades.

It is also possible to form the various portions of the fiber structure with yarns presenting different chemical natures so as to give them desired particular properties, in particular the ability to withstand wear or oxidation.

The invention also provides a composite material part having a reinforcing fiber structure of a material as defined above and densified by a matrix, whether a composite material part with a resin matrix, in particular a turbomachine blade, or a part made of thermostructural composite material.

BRIEF DESCRIPTION OF THE DRAWINGS

The invention can be better understood on reading the following description made with reference to the accompanying drawings, in which:

FIGS. 4A to 4H show the different successive weave planes of a fiber structure, combining an interlock weave in its core and a plain weave at its skin;

FIGS. 5A to 5H show different successive weave planes of a fiber structure constituting an embodiment of the invention combining an interlock weave in its core and a satin weave at its skin;

FIGS. 6A to 6J and 7A to 7H show portions of different successive weave planes of a fiber structure constituting two other embodiments of the invention and combining an interlock weave in their cores and a multiple satin weave at their skins;

FIGS. 8A to 8J show portions of the different successive weave planes of a fiber structure constituting another embodiment of the invention, combining an interlock weave in its core and a satin weave at its skin;

FIGS. 13A to 13H show the successive weave planes of a portion of a fiber structure having three weft layers in accordance with another feature of the invention;

FIGS. 14A to 14D show the weave planes of a transition portion between the fiber structure portions of FIGS. 12A-12D and 13A-13H, in accordance with a feature of the invention;

FIG. 15A to 15H show the successive weave planes of a transition portion between the fiber structure portion of FIGS. 13A to 13H, and a fiber structure portion of thickness increased by a complete layer of weft yarns, in accordance with a feature of the invention.

DEFINITIONS

The term "two-dimensional weave" or "2D weave", is used herein to mean a conventional method of weaving in which each warp yarn passes from one side to the other of yarns in a single weft layer.

The term "three-dimensional weave" or "3D weave" is used herein to mean a method of weaving in which at least some of the warp yarns connect together weft yarns over a plurality of weft layers.

Figure 1:
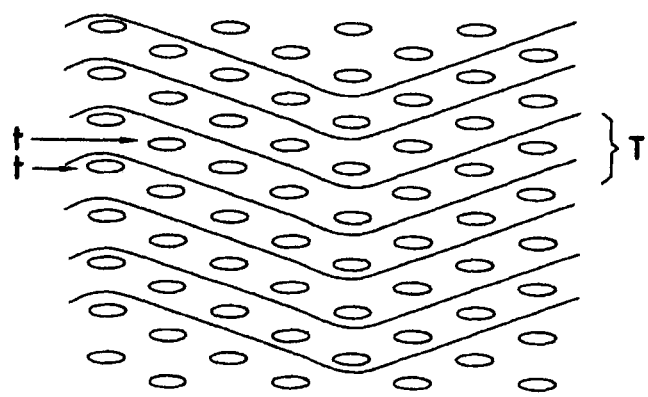
FIGS. 1 to 3 show a plane of interlock and multilayer three-dimensional weaves.

The term "interlock weave" is used herein to mean a 3D weave in which each warp layer connects together a plurality of weft layers with all of the yarns in a given warp column having the same movement in the plane of the weave. FIG. 1 is a view of one of eight planes of an interlock weave having seven warp layers and eight weft layers. In the interlock weave shown, a weft layer T is made up of two adjacent weft half-layers t offset from each other in the warp direction. There are thus sixteen weft half-layers positioned in staggered rows. Each warp connects three weft half-layers. Below, the term "layer" can be used to designate a complete layer or a half-layer of weft yarns, unless specified to the contrary.

It is also possible to adopt a weft disposition that is not staggered, with the weft yarns of two adjacent weft layers being aligned on the same columns.

Figure 2:
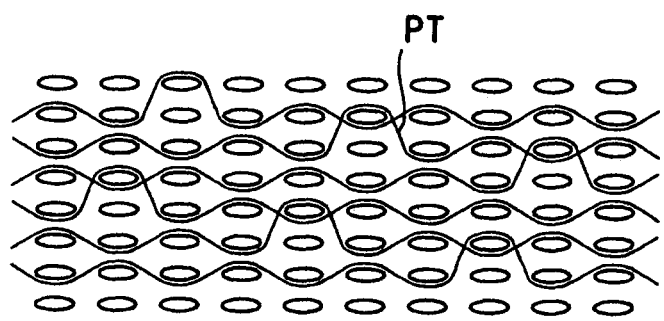

The term "multilayer weave" is used herein to designate a 3D weave with a plurality of weft layers with the basic weave of each layer being equivalent to a conventional 2D weave, such as a weave of plain, satin, or serge type, but with certain points of the weave connecting together the weft layers together. FIG. 2 shows a plane of plain type multilayer fabric, or "multiple plain fabric" in which the warp yarns are, from time to time, deflected from their conventional 2D plain path associated with one weft to engage a yarn of an adjacent weft and forms particular plain interlace points PT connecting together two adjacent weft layers. At a particular plain interlace point PT, the warp yarn passes around two weft yarns situated in the same column in two adjacent weft layers.

Figure 3:
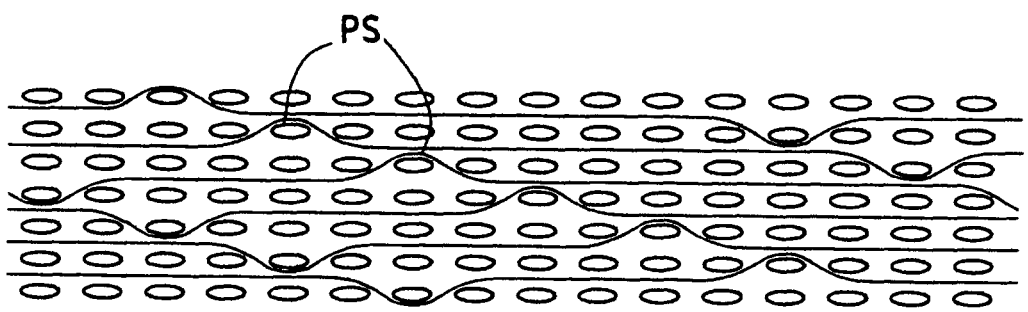
Figure 6F:
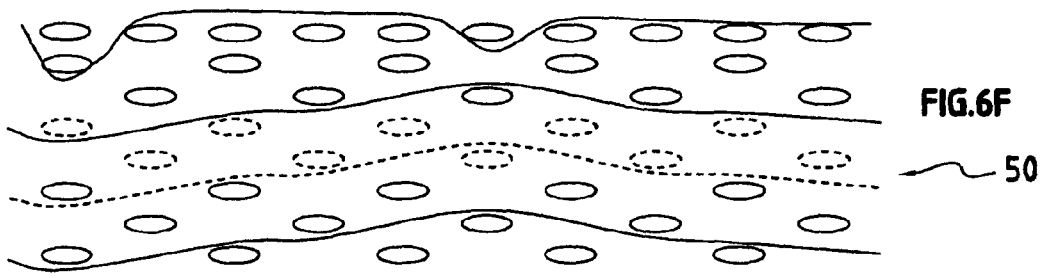
Figure 6G:
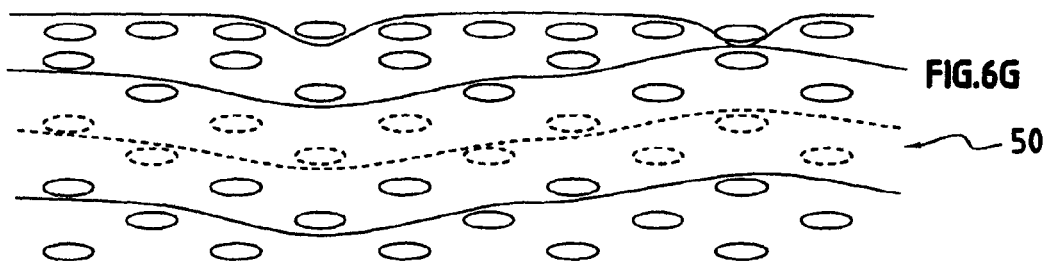
Figure 6H:
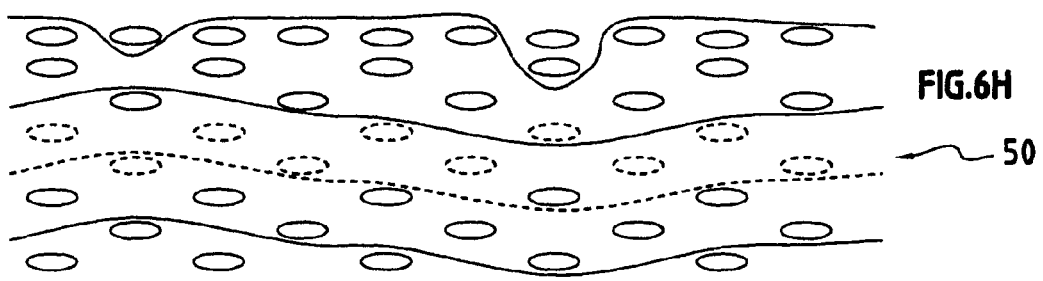
Figure 6I:
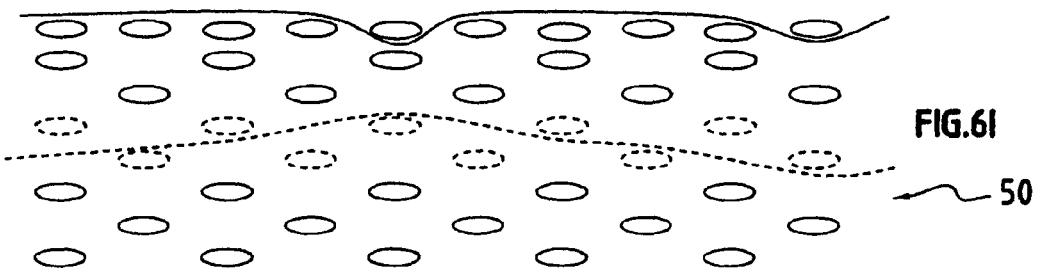
Figure 6J:
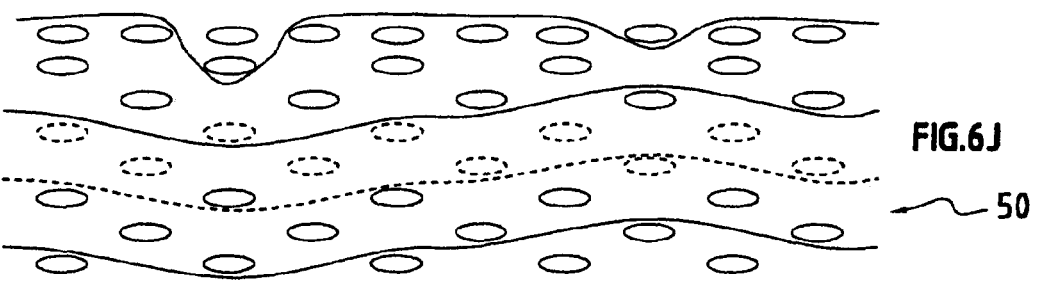
Figure 7E:
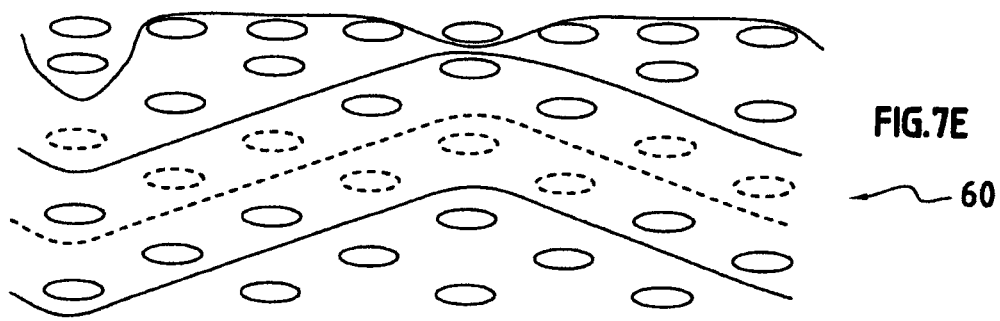
Figure 7F:
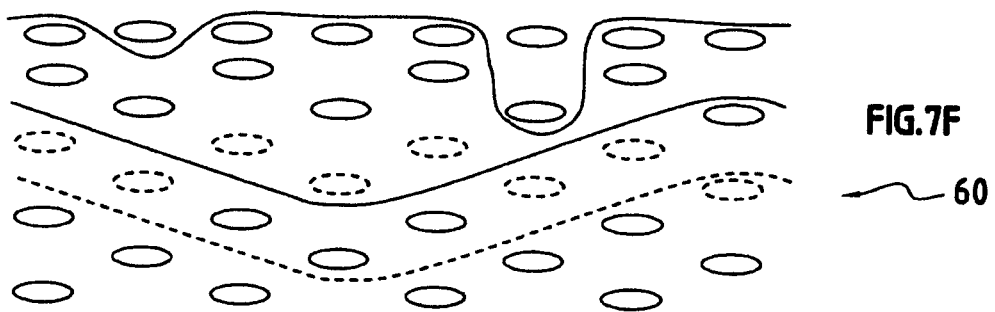
Figure 7G:
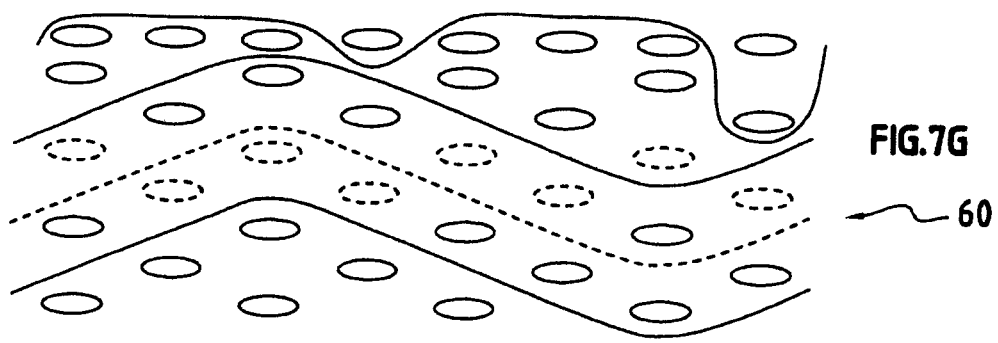
Figure 7H:
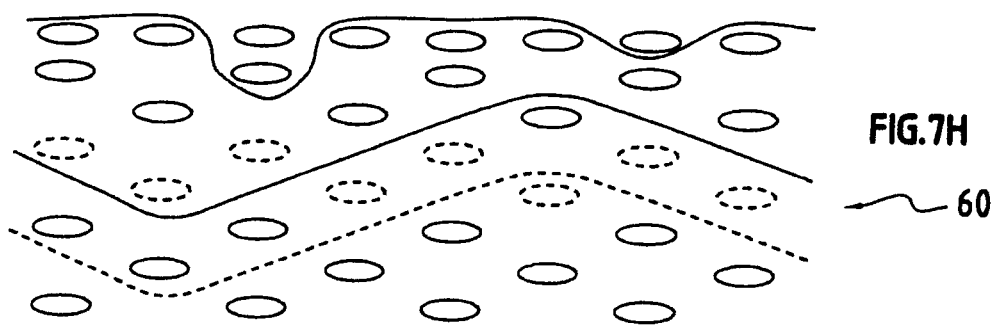
Figure 8C:
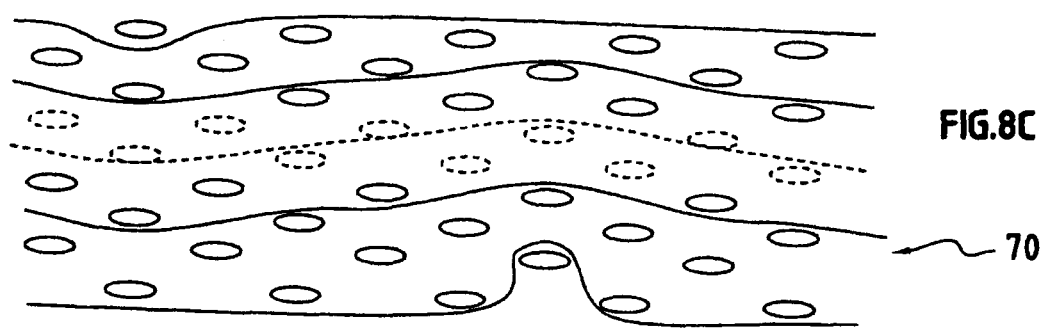
Figure 8D:
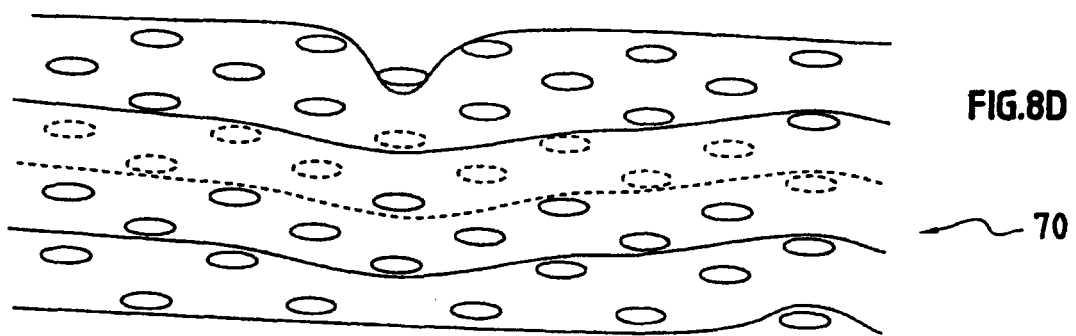
Figure 8E:
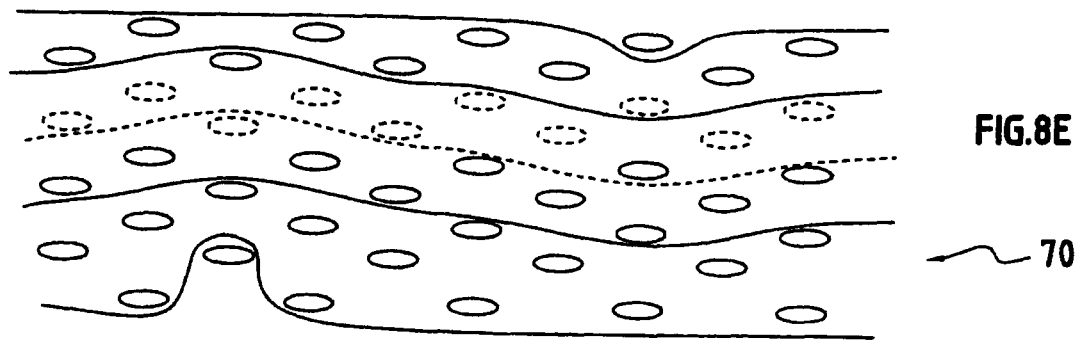
Figure 8F:
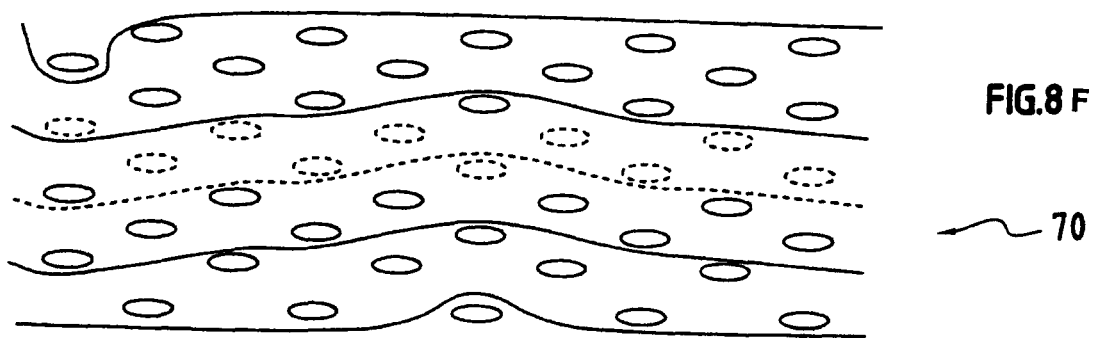
Figure 8G:
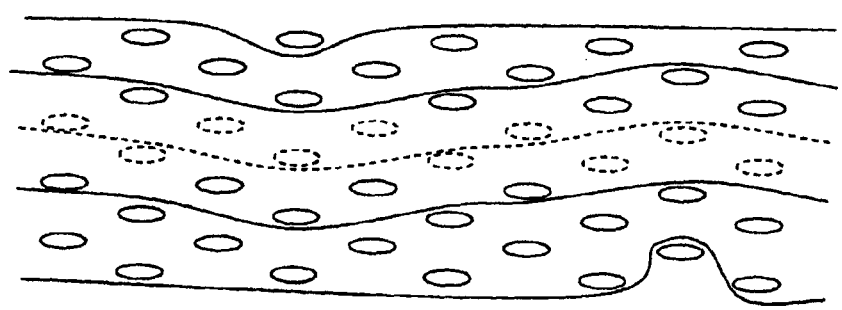
Figure 8H:
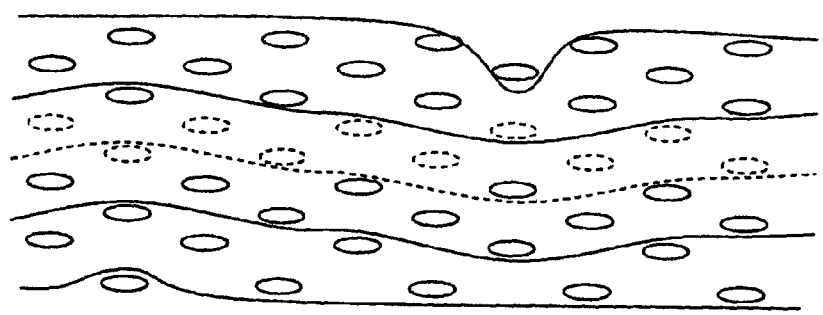
Figure 8I:
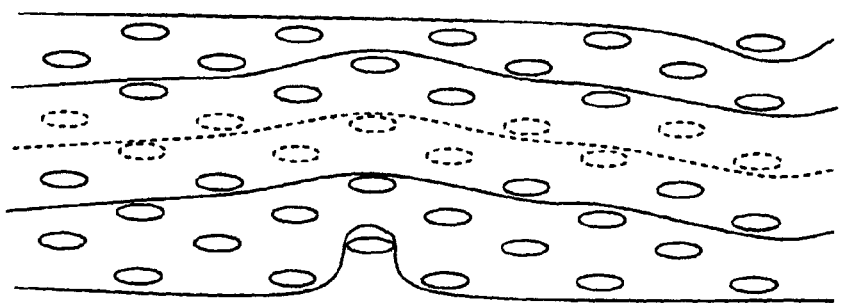
Figure 8J:
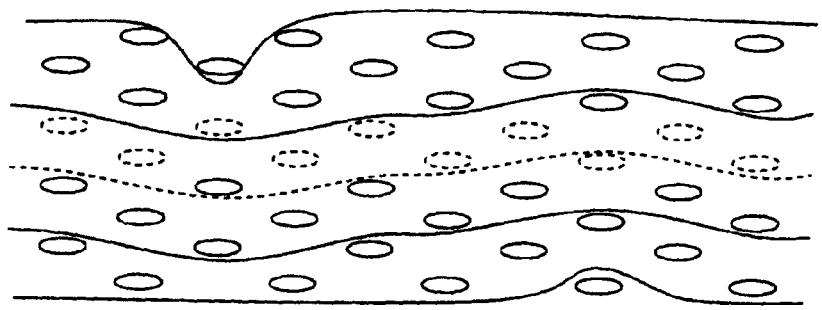

FIG. 3 shows a plane of satin type multilayer fabric, or "multiple satin fabric", in which each warp yarn is deflected in alternation in one direction and in the opposite direction in alternation to take hold of one weft yarn in n in a first layer of weft yarns and one weft yarn in n in a second layer of weft yarns adjacent to the first, where n is an integer greater than 2, thus connecting together two layers. In the example shown, n=16.

In a satin type weave, the "pitch" designates the interval between two satin interlace points of a given warp yarn measured as a number of weft columns. In FIG. 3, such a pitch alternates between 6 and 10, giving a mean multiple satin pitch of 8, i.e. n/2.

In the weaves of FIGS. 2 and 3, the weft yarns are not staggered, the weft yarns of two adjacent layers of weft yarns being aligned in the same columns. Nevertheless, it is possible to have a staggered weft disposition as shown in FIG. 1, the connections being made between two adjacent weft half-layers.

It should be observed that a connection by means of a given warp yarn in a multiple plain or multiple satin weave is not restricted to two adjacent weft layers, but may extend over a depth of more than two weft layers.

The term "count" is used herein to designate the number of yarns per unit length in the weft direction and in the warp direction, a count that is low (or loose) meaning a smaller number of yarns, and thus a fabric that is more open as compared with a count that is high (or tight).

Throughout the text below and in all of the drawings, by convention and for convenience, it is stated or shown that it is the warp yarns that are defected from their paths to take hold of weft yarns in a weft layer or a plurality of weft layers. Nevertheless, the functions could be inverted between warp and weft, and the inverted configuration should be considered as being also covered by the claims.

DETAILED DESCRIPTION OF EMBODIMENTS OF THE INVENTION

The field of application of the invention is that of making fiber structures suitable for constituting fiber reinforcement, or preforms, for fabricating composite material parts, with the parts being obtained by densifying fiber structures with a matrix. The matrix is typically a resin, when the composite materials are used at temperatures that are relatively low, typically up to 300° C., or a refractory material such as carbon or ceramic for thermostructural composite materials.

Making the fiber structure by 3D weaving makes it possible in a single textile operation to obtain bonding between the layers, and thus to have a fiber structure and a resulting composite material part that presents good mechanical strength.

It is advantageous to promote obtaining a surface state, after densification, that is free from major irregularities, i.e. that presents a good finish, so as to avoid or limit finishing operations by machining or so as to avoid forming clumps of resin in resin-matrix composites. For this purpose, in a fiber structure having an internal portion or core and an external portion or skin adjacent to an outside surface of the fiber structure, the skin is made by weaving with a satin type weave providing a smooth surface appearance.

It can be desirable to vary the caliber of the yarns used for weaving the fiber structure, in particular by using yarns of different calibers in the core and the skin and/or for the warp and for the weft. The calibers of the yarns may be selected in particular to obtain a ratio between the volume percentage of warp fibers and the volume percentage of weft fibers that lies within desired limits.

In order to obtain mechanical properties that present as little non-uniformity as possible within a composite material part, it is also advantageous to encourage densification of the reinforcing fiber structure with a densification gradient that is as small as possible between the core of the fiber structure and its skin, in particular when performing CVI densification. For this purpose, in order to encourage access to the core of the preform, the weaving of the core may be implemented using an interlock weave, thereby providing easy communication between a plurality of fabric layers.

It is also possible to make the core and the skin by multilayer weaving using different weaves.

Likewise for the purpose of encouraging access to the core of the fiber structure during densification, the skin can be made using a count that is looser than that of the core.

It is also possible to cause the three-dimensional weave to vary in the core portion, e.g. by combining different interlock weaves, or an interlock weave with a multilayer weave, or indeed different multilayer weaves.

It can be desirable to vary the caliber of the yarns used for weaving the fiber structure, in particular by using yarns of different calibers in the core and the skin and/or for the warp and for the weft. Yarn caliber decreasing between the core and the skin encourages access to the core for infiltration through the skin when performing CVI densification. The calibers of the yarns may be selected in particular to obtain a ratio between the volume percentage of warp fibers and the volume percentage of weft fibers that lies within desired limits.

It can also be desirable to use yarns of different chemical natures between the various portions of the fiber structure, in particular between the core and the skin in order to confer particular properties to the resulting composite material part, in particular in terms of ability to withstand oxidation or wear.

Thus, for a thermostructural composite material part having refractory fiber reinforcement, it is possible to use a preform having carbon fibers in its core, and ceramic fibers in its skin, e.g. silicon carbide (SiC) fibers, in order to increase the ability of the composite part to withstand wear via said skin portion.

Embodiments of fiber structures in accordance with the invention are described below. In all of these embodiments, weaving is performed using a Jacquard type loom.

EXAMPLE 1

Not Covered by the Claims

FIGS. 4A to 4H show portions of eight successive planes of a fiber structure weave obtained by 3D weaving, the weft yarns being visible in section.

The fiber structure 10 comprises nine weft yarn layers, i.e. eighteen half-layers t1 to t18. In the core 12 situated between two opposite skins 14 and 16, the 3D weaving is of the interlock type with a 10/10 count per layer (ten yarns per centimeter in the weft and warp directions). In the skins 14 and 16, the weaving is two-dimensional with a plain type weave with a 5/5 count per layer. The plain weave applies only to half-layers t1 and t2 and to half-layers t17 and t18 of weft yarns. It should be observed that the 3D interlock weave of the core extends to the outermost half-layers t1, t18 of the skins so as to bond these half-layers to the core layers.

In this example, the methods of weaving and the counts vary between the core and the skins. The plain weave skin encourages obtaining a surface state that is relatively smooth. When densification is performed by CVI, the interlock 3D weave of the core promotes minimizing a densification gradient between the skin and the core, and a smaller count in the skins promotes access to the core of the fiber structure through the skins.

EXAMPLE 2

FIGS. 5A to 5H show successive planes of a fiber structure weave 20 obtained by 3D weaving, said structure differing from that of Example 1 in that in the skins 24, 26, the weaving is a satin weave with a 5×5 count and involves only the outermost half-layers of weft yarns t1 and t18, while the weave of the core 22 is of the interlock type with a 10×10 count per layer.

In this example, the method of weaving varies between the core 22 and the skins 24, 26, the skin satin weave giving a smooth surface appearance.

EXAMPLE 3

FIGS. 6A to 6J show a portion of the successive planes of a fiber structure 50 obtained by 3D weaving, using an interlock weave in the core 52 and a multilayer weave at the skin. The interlock weave is made with each warp yarn extending over a depth of two half-layers of weft yarn. The multilayer weave at the skin 56 is made with a multiple satin type weave having a pitch of 5, uniting an external weft layer formed by two half-layers with an adjacent weft half-layer.

Only a portion of the weave is shown, it being possible to increase the number of weft layers as represented by dashed lines, and the skin opposite to the skin 56 not being shown, the weave of said opposite skin possibly being of the same type as that of the skin 56.

EXAMPLE 4

FIGS. 7A to 7H show portions of the successive planes of a fiber structure 60 obtained by 3D weaving in a variant of Example 3, the interlock weave in the core 62 extending over three half-layers of weft yarns instead of two, and the weave at the skin 66 being a multiple satin weave with a pitch of 4. The weave at the skin extends over the external layer of weft yarn, made up of two united half-layers, and in alternation over one or the other of the adjacent half-layers of weft yarn adjacent to the external layer.

EXAMPLE 5

FIGS. 8A to 8J show the successive weave planes of a fiber structure 70 obtained by 3D weaving using a 3D interlock weave in the core 72 and a satin weave of pitch 10 at the skins 74, 76.

The weft yarns are in a staggered disposition. The number of weft half-layers in the core could be greater, as represented by dashed lines.

The interlock weave in the core extends over two half-layers, and the satin weave at the skin likewise extends over two half-layers, the external half-layer at the skin not being involved with the interlock weave of the core.

EXAMPLE 6

Figure 9:
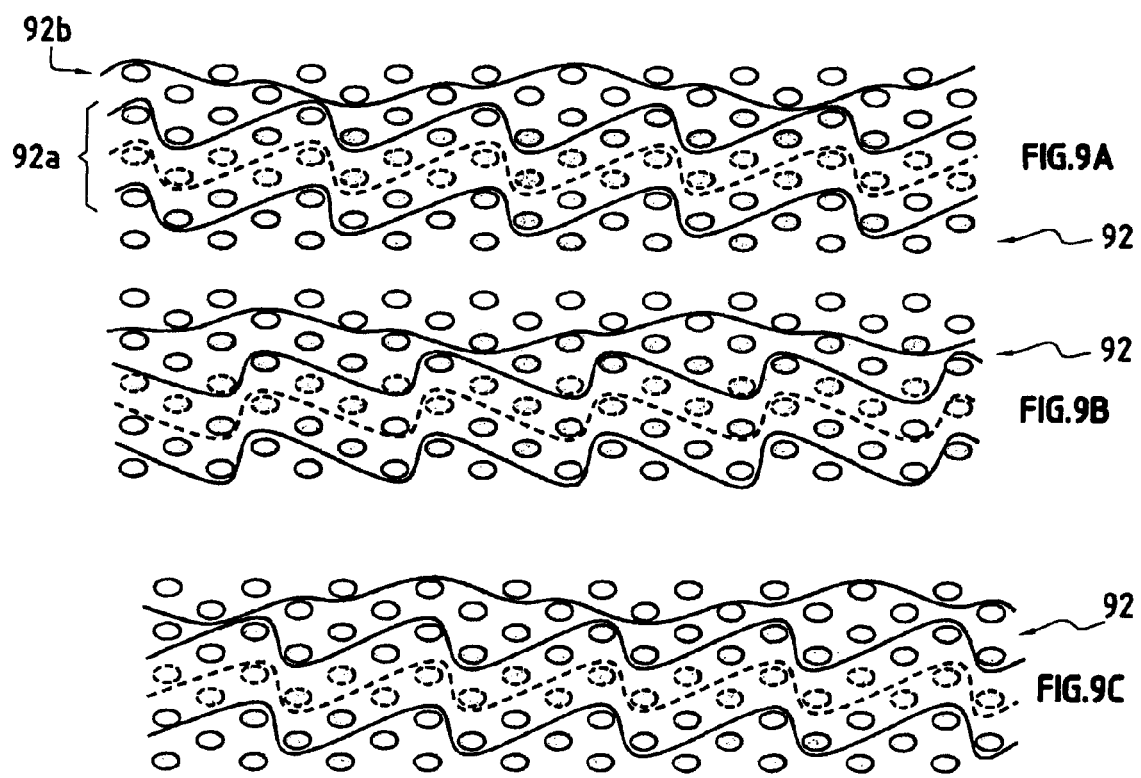
FIGS. 9A to 9T and 10AA to 10BN show portions of the different successive weave planes of fiber structures constituting two other embodiments of the invention, combining different interlock weaves in their cores.
Figure 9D:
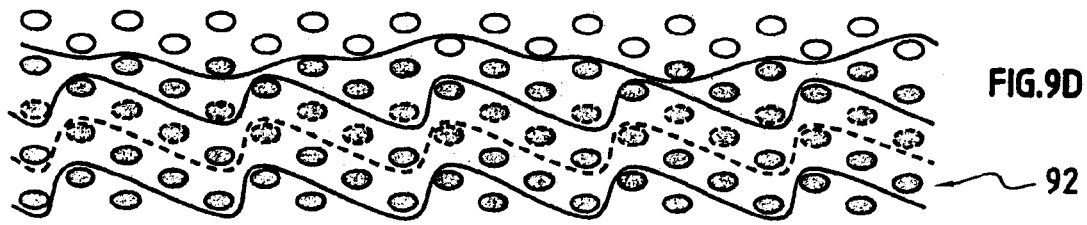
Figure 9E:
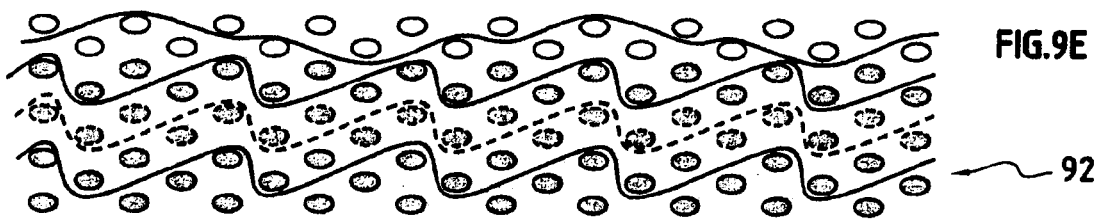
Figure 9F:
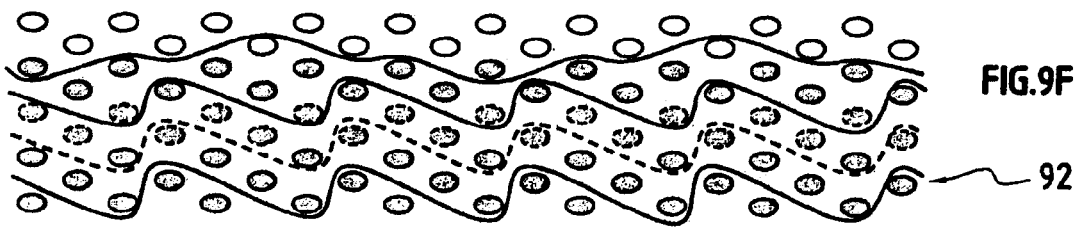
Figure 9G:
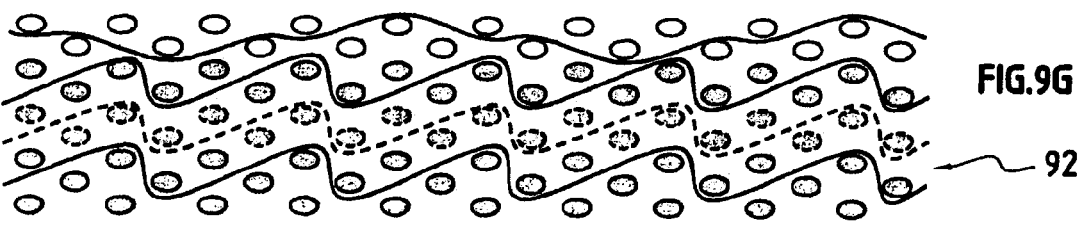
Figure 9H:
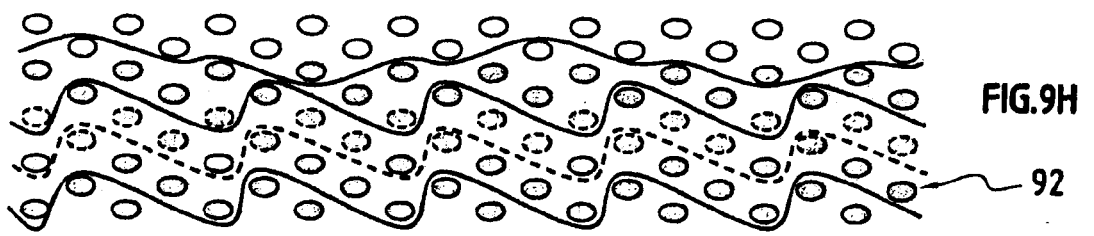
Figure 9I:
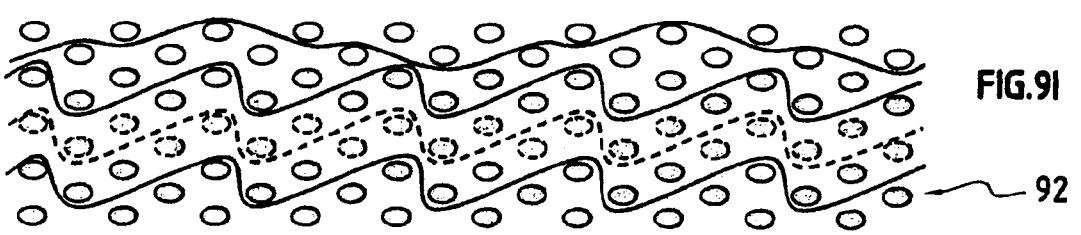
Figure 9J:
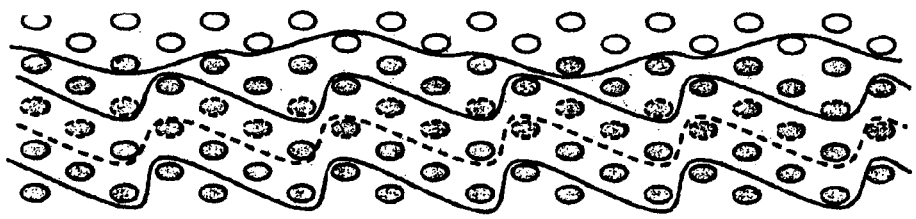
Figure 9K:
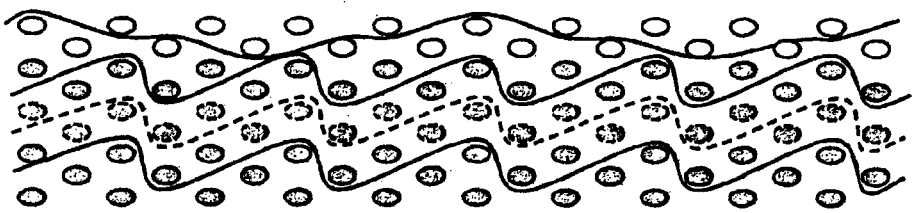
Figure 9L:
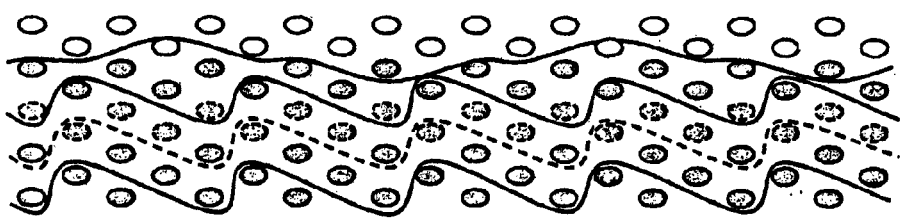
Figure 9M:
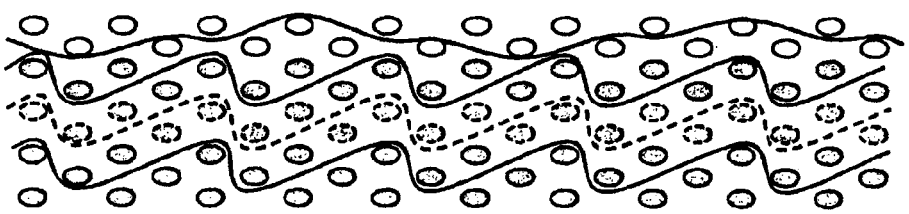
Figure 9N:
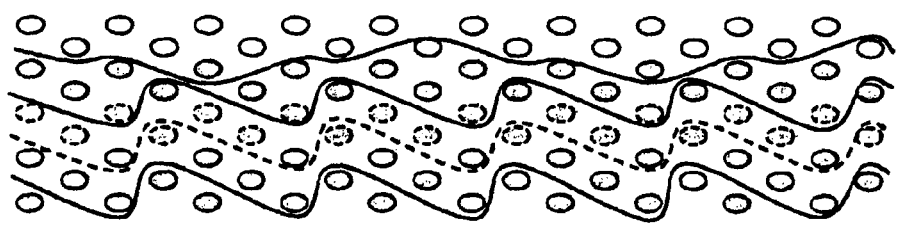
Figure 9O:
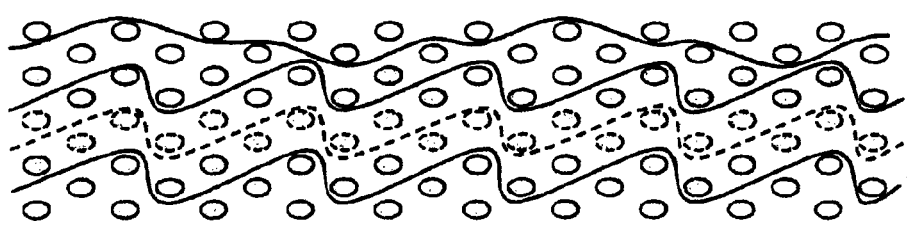
Figure 9P:
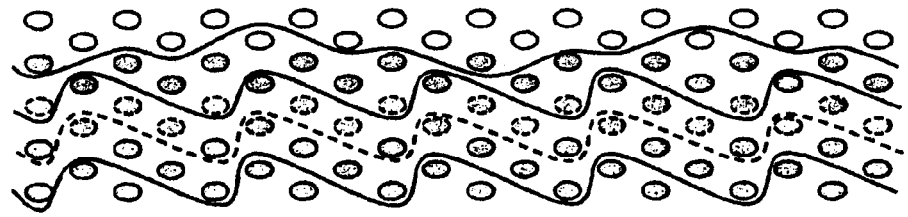
Figure 9Q:
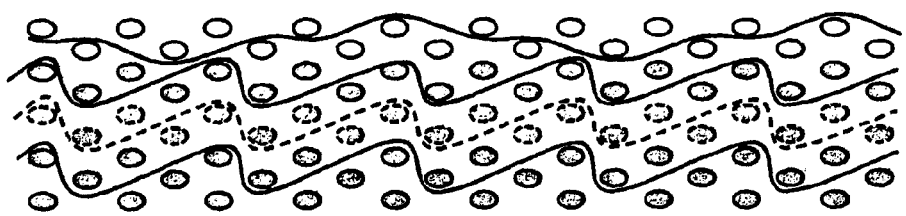
Figure 9R:
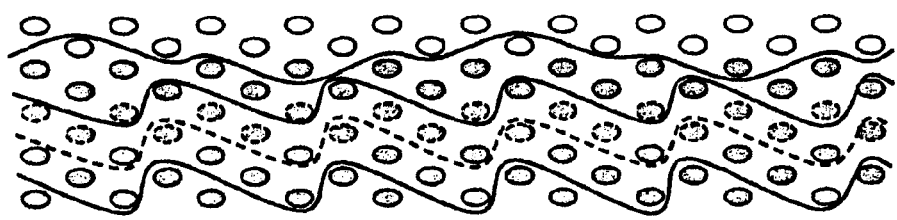
Figure 9S:
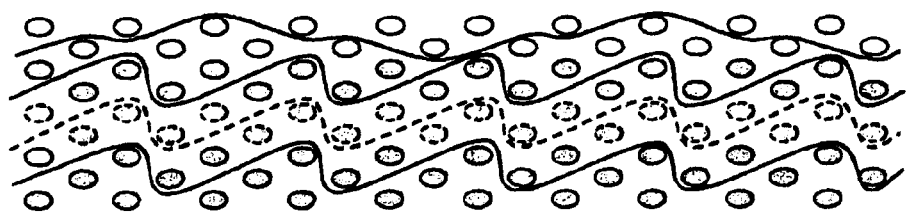
Figure 9T:
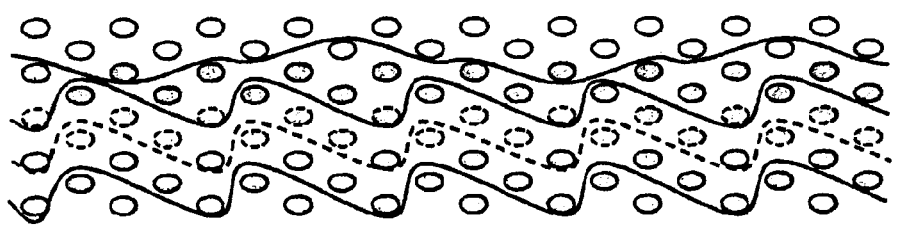

FIGS. 9A to 9T show portions of twenty successive planes of a portion of a core 92 of a fiber structure obtained by 3D weaving, the weft yarns being in a staggered disposition.

The core portion 92 comprises a first portion 92a woven with a first interlock weave over two half-layers of weft yarns and a second portion 92b woven with a second interlock weave over two half-layers of weft yarns. In the first portion 92a, the warp yarn drawn in dashed lines merely shows that one or more warp yarns can be provided on the same path depending on the desired thickness. In the second portion 92b, only one warp yarn is shown. This should be repeated as many times as necessary depending on the desired thickness.

The second portion 92b is situated between the first portion 92a and a skin portion that is not shown. The weave of the skin could be a multilayer weave, for example, having a multiple satin weave like the skin portion 56 of the fiber structure of Example 3.

When the core portion 92 is situated between two opposite skin portions, it may include a third portion situated between the first portion and the skin portion, on the other side of the first portion compared with the second portion 92a, e.g. symmetrical thereto about a midplane.

The use of two different weaves in the core portion makes it possible to have different mechanical properties. In the example shown, the interlock weave in the portion 92a provides stronger bonding of the weft yarns than does the interlock weave in the portion 92b.

EXAMPLE 7

Figure 10A:
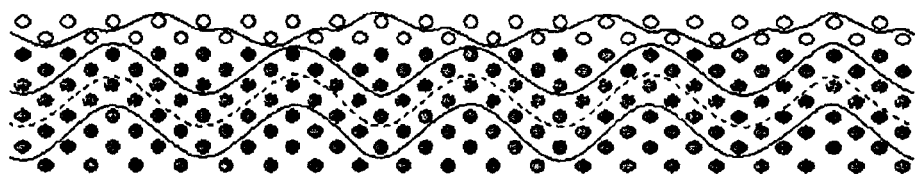
Figure 10A:
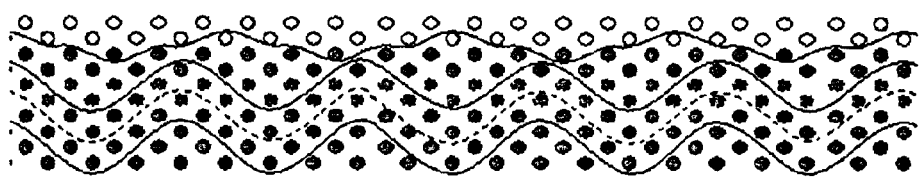
Figure 10A:
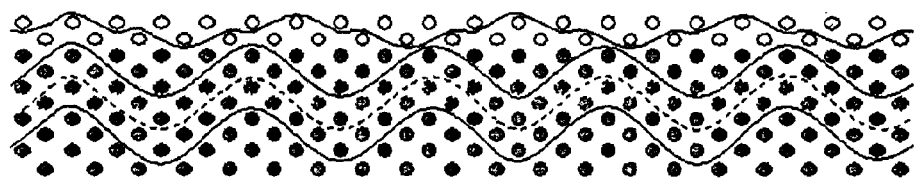
Figure 10A:
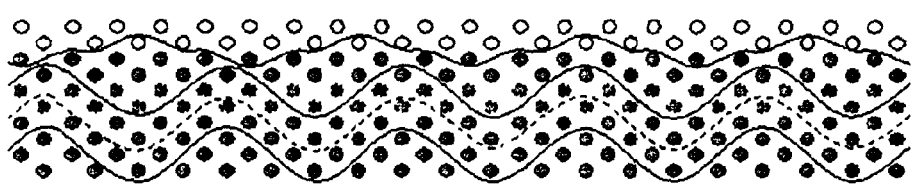
Figure 10A:
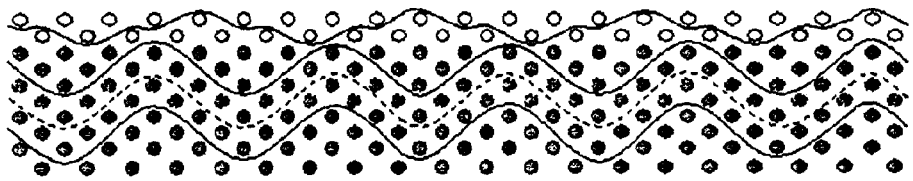
Figure 10A:
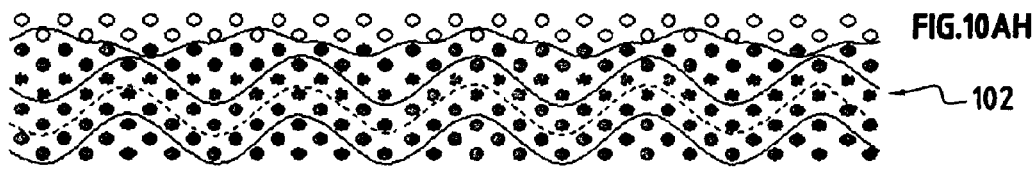
Figure 10A:
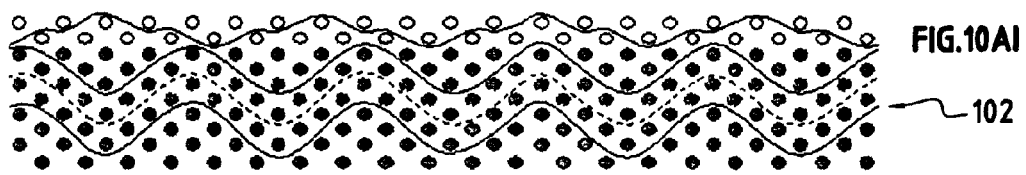
Figure 10A:
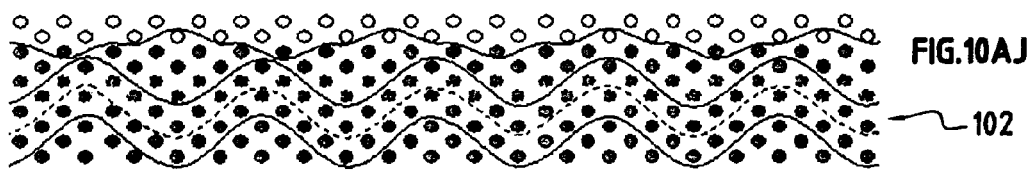
Figure 10A:
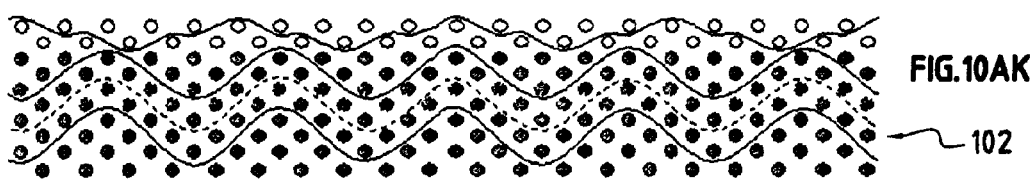
Figure 10A:
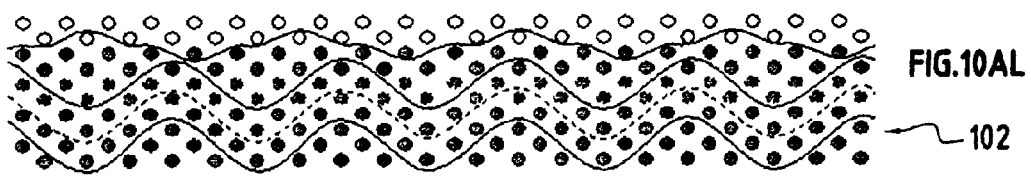
Figure 10A:
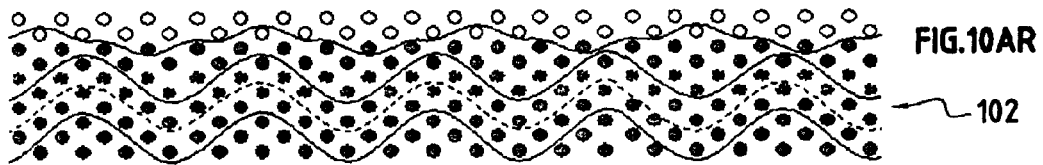
Figure 10A:
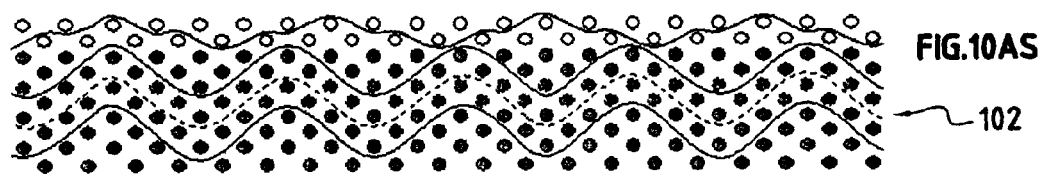
Figure 10A:
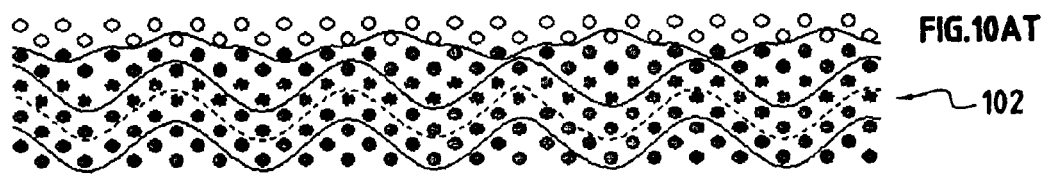
Figure 10A:
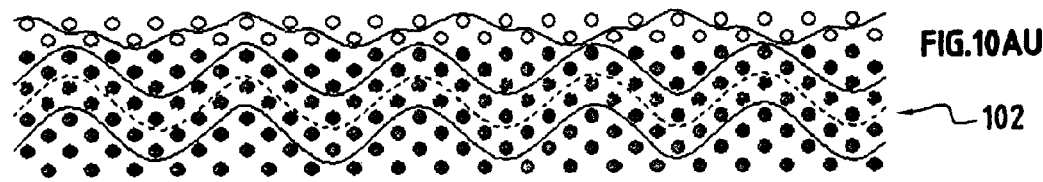
Figure 10A:
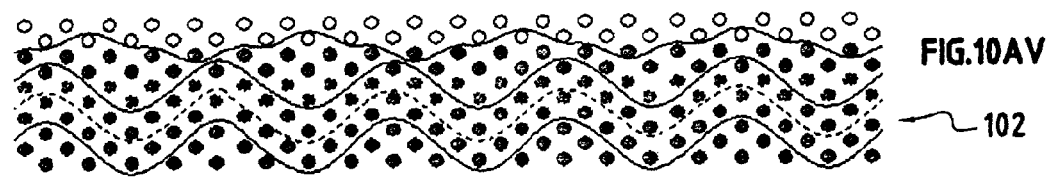
Figure 10A:
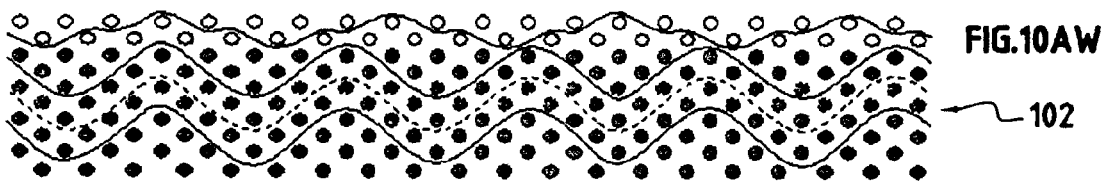
Figure 10A:
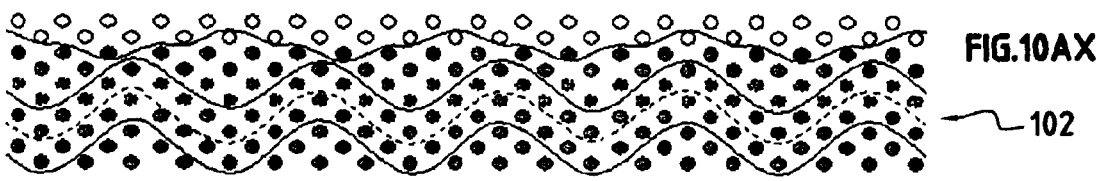
Figure 10A:
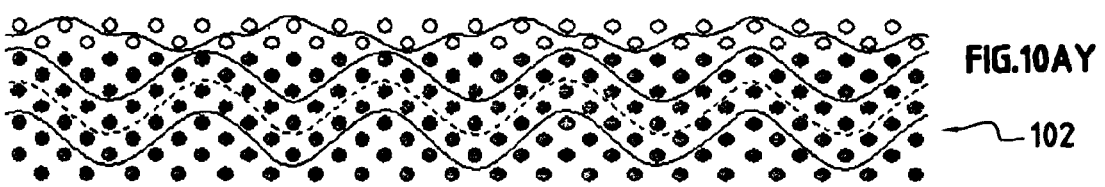
Figure 10A:
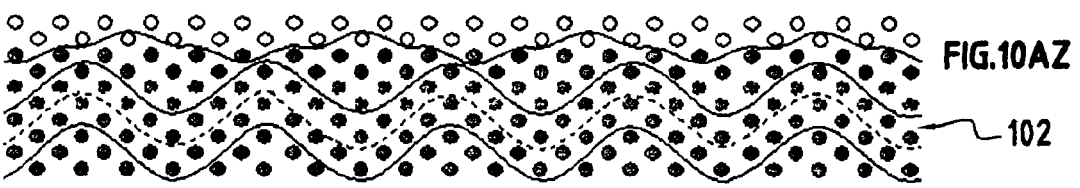
Figure 10B:
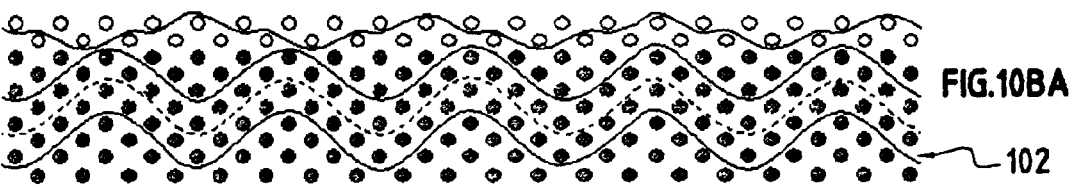
Figure 10B:
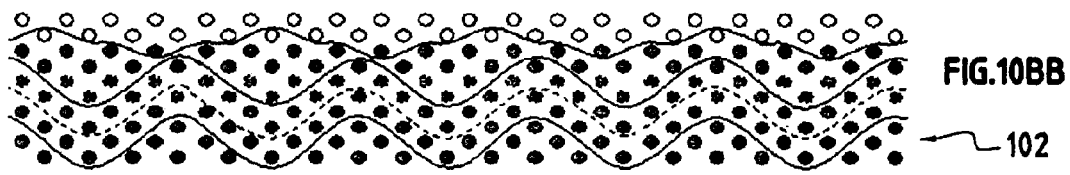
Figure 10B:
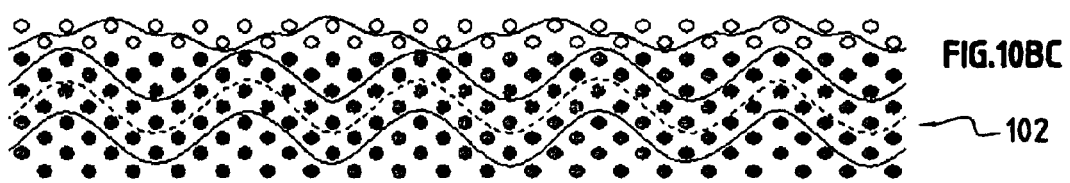
Figure 10B:
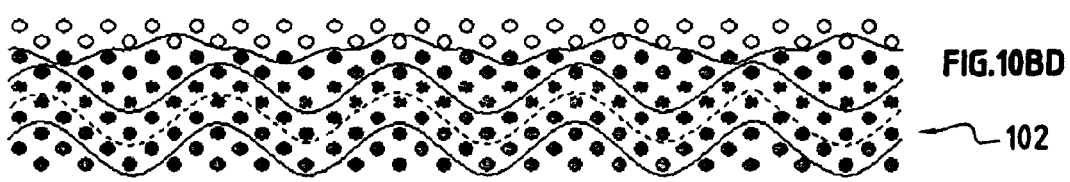
Figure 10B:
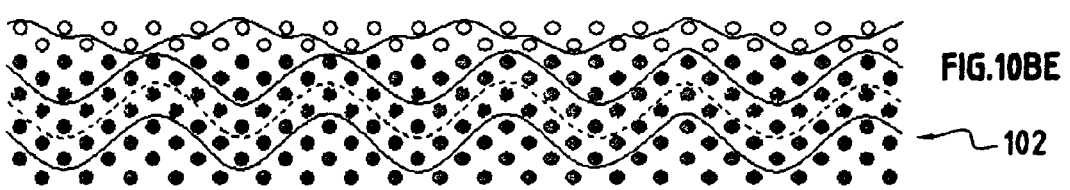
Figure 10B:
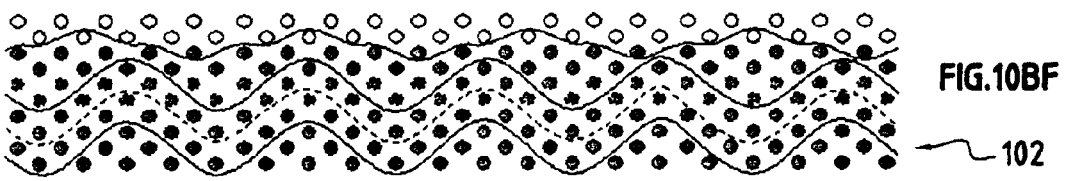
Figure 10B:
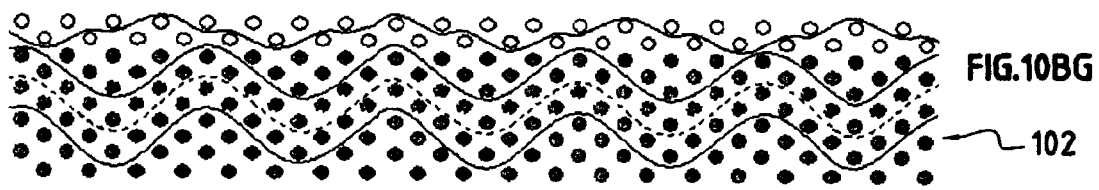
Figure 10B:
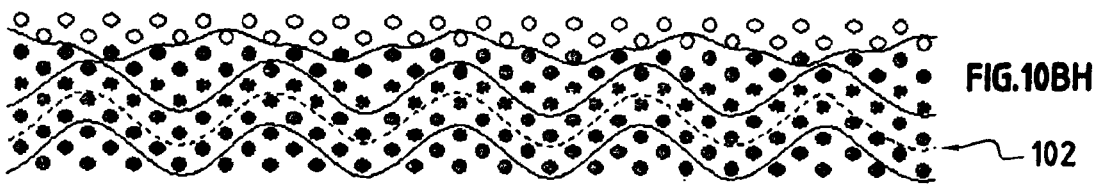
Figure 10B:
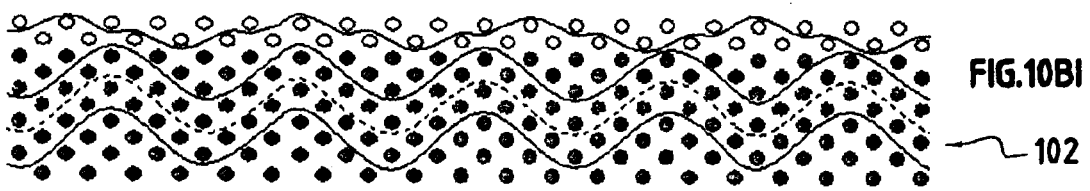
Figure 10B:
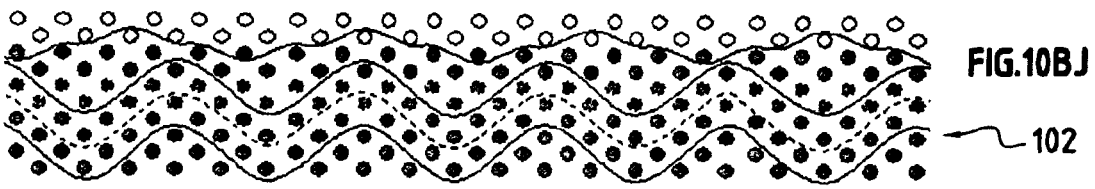
Figure 10B:
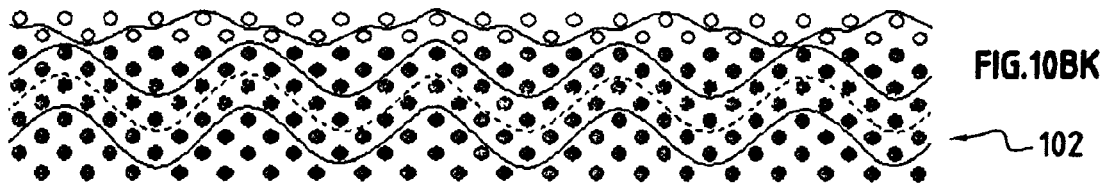
Figure 10B:
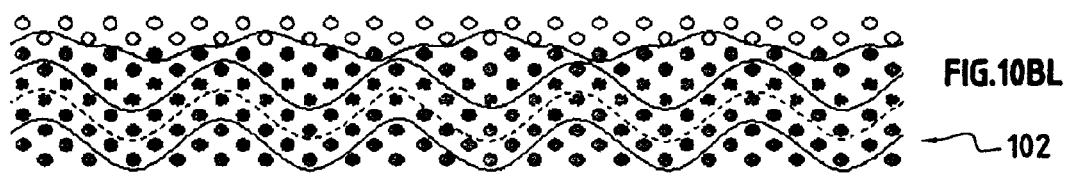
Figure 10B:
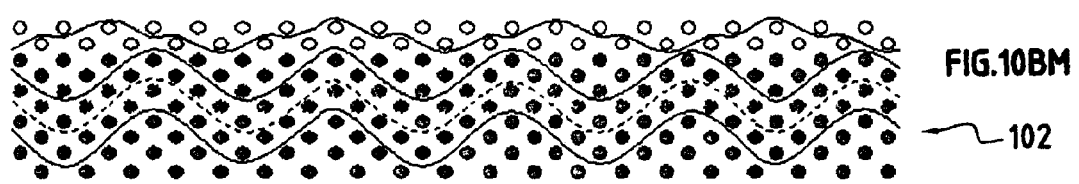
Figure 10B:
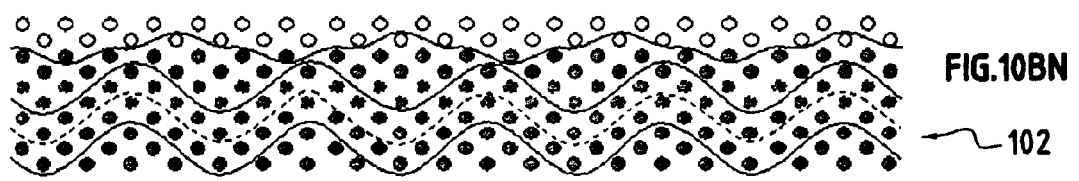

FIGS. 10AA to 10BN show portions of 40 successive planes of a core portion 102 of a fiber structure obtained by 3D weaving, the core portion 102 differing from the core portion 92 of Example 6 by an interlock weave that is different in the first portion 102a, while the interlock weave in the second portion 102b is the same as that in the second portion 92b of Example 6.

The interlock weave of the portion 102a provides weaker bonding than the weave in the portion 92a of Example 6, but it is easier to weave.

EXAMPLE 8

Figure 11A:
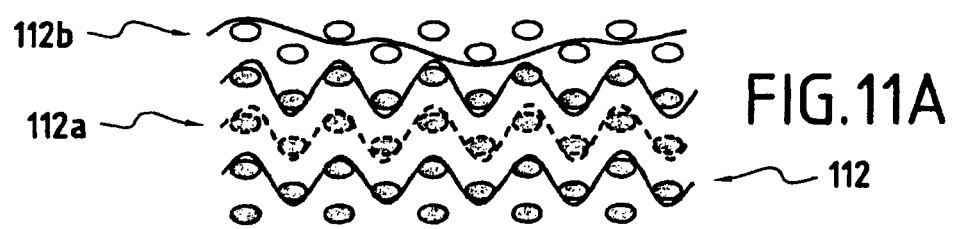
FIGS. 11A and 11B show portions of two weave planes of a fiber structure constituting another embodiment combining a multilayer plane type weave with an interlock weave in its core.
Figure 11B:
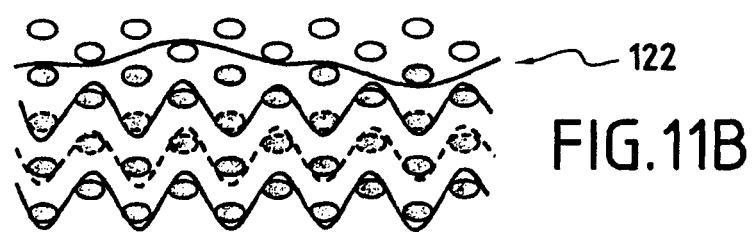
Figure 12A:
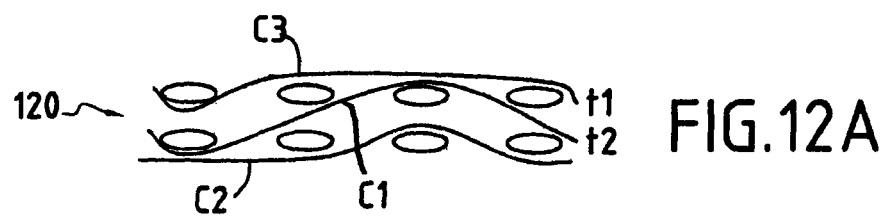
FIGS. 12A to 12D show the successive weave planes of a portion of a fiber structure having two weft layers in accordance with a feature of the invention.
Figure 12B:
Figure 12C:
Figure 12D:
Figure 13E:
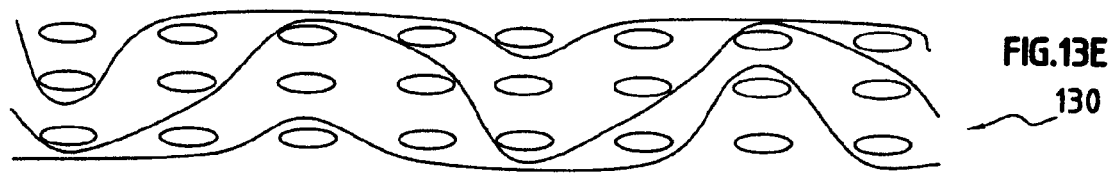
Figure 13F:
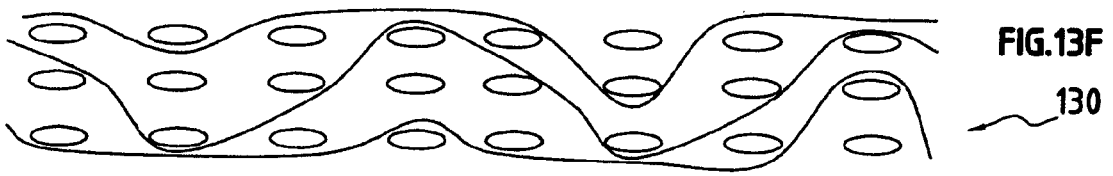
Figure 13G:
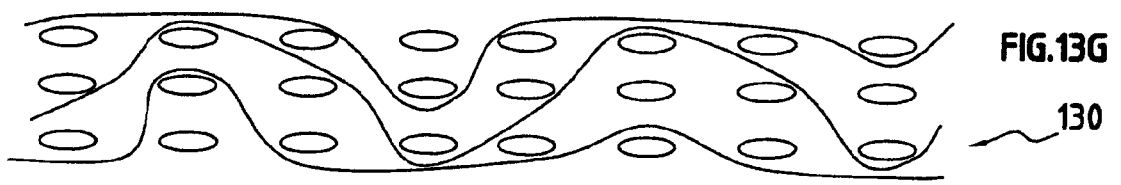
Figure 13H:
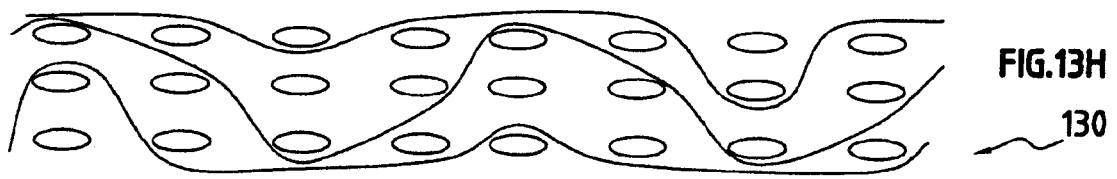
Figure 15E:
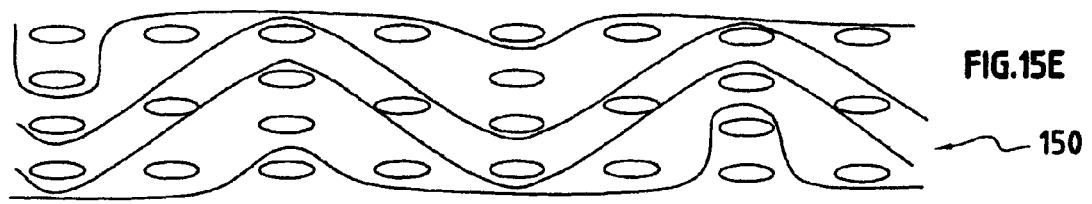
Figure 15F:
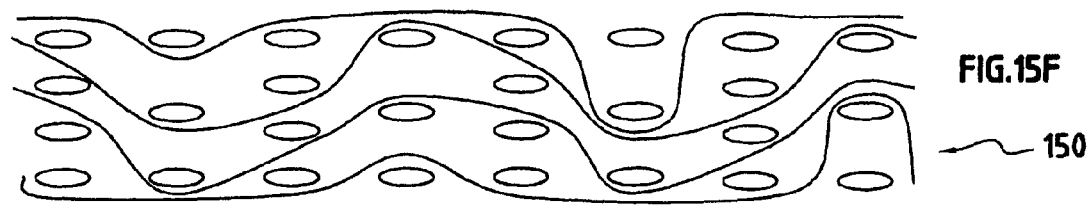
Figure 15G:
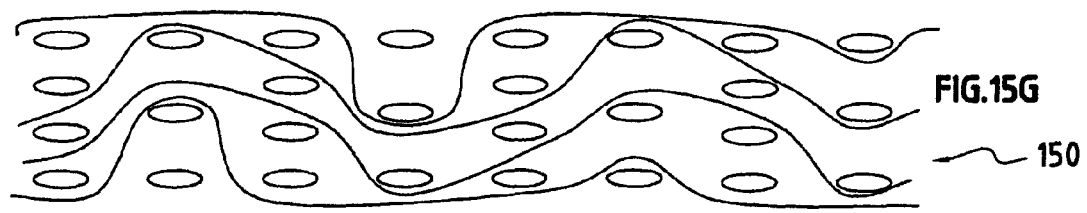
Figure 15H:
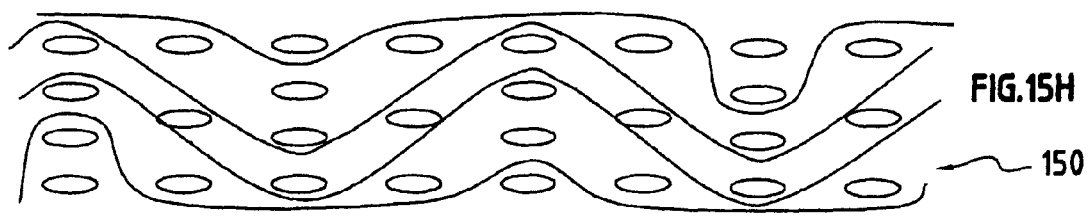

FIGS. 11A and 11B show portions of two successive planes of the core portion 112 of a fiber structure that differs from that of Example 6 in that the weave in the first portion 112a of the core portion 112 is of the multiple plain type, while the weave in the second portion 112b is of interlock type similar to that in the second portion 92b of Example 6.

The multiple plain weave in the portion 122a provides very strong bonding of the weft yarns.

EXAMPLE 9

FIGS. 12A to 12D show successive planes of a weave for a fiber structure portion 120 of very small thickness, having only two layers of weft yarns t1 and t2.

The weft layers are bonded together by a warp C1 using an interlock type weave, while the yarns in each weft are bonded together by a two-dimensional weave using respective warps C2 and C3. The two-dimensional weave is of the satin type. Such a weave can be suitable in particular for the portion of a fiber structure that corresponds to a very thin portion of a composite material part that is to be made, e.g. for the portion adjacent to the trailing edge of the airfoil of a turbomachine blade.

EXAMPLE 10

FIGS. 13A to 13H show successive planes of a weave for a portion 130 of a thin fiber structure, having only three layers of weft yarns, i.e. skin layers t1 and t2 and an intermediate core layer t3.

The weft layers are bonded together by a yarn using an interlock type weave. In the skins 134, 136 of the fiber structure 130, weaving is performed with a multiple satin weave. In a variant, it is possible to perform two-dimensional weaving at the skin using a satin type weave.

It should be observed that in the fiber structure portions 120 and 130, the wefts are not in a staggered disposition, unlike the preceding examples.

EXAMPLE 11

FIGS. 14A to 14D show successive planes of a portion 140 of fiber structure forming a transition between the portions 120 and 130 of Examples 9 and 10.

In the portion 140, there can be seen the weft yarns t1 and t2 and an intermediate layer t'3 that is partial, e.g. a layer that contains half the number of weft yarns as the layers t1 and t2.

The intermediate layer t'3 is bonded to the layers t1 and t2 by an interlock weave in similar manner to the interlock weave bonding together the weft yarns of the portion 130.

At the skin, in the layers t1 and t2, two-dimensional weaving is performed, using a satin weave, similar to that used in each of the layers t1 and t2 of the fiber structure portion 120.

EXAMPLE 12

FIGS. 15A to 15H show successive planes of a portion 150 of fiber structure forming a transition between the portion 130 of Example 10 and a portion having thickness that is increased by one layer.

In the portion 150 there can be seen the layers of weft yarns t1 and t2, the intermediate layer t3, and an additional weft layer t'4 that is partial, e.g. a half-layer, the yarns of the layer t3 being offset by one weft column to the next so as to form a staggered disposition.

In the core 152, the layers t3 and t'4 are bonded to the layers t1 and t2 by weaving with an interlock weave. At the skin 154, 156, in the layers t1 and t2, multilayer weaving is used, specifically a multiple satin weave of the same type as that used as the skin in the structure portion 60 of FIGS. 7A to 7H.

The weaves of Examples 9 to 12 serve to increase the thickness of a fiber structure progressively while ensuring continuity of the skin weave. For this purpose, it is desirable to pass from a plane P of a weave to the plane P+1 of the following weave (modulo the number of planes therein). For example, an increase in the thickness of the structure 120 to the structure 150 can be obtained progressively by the following succession:

planes 1, 2, 3 (FIGS. 12A, 12B, 12C) having the weave of the structure 120;
  planes 4, 5, i.e. 4, 1 (since 5=1 modulo 4) (FIGS. 14D, 14A) of the weave of the transition structure 140;
  planes 6, 7, 8 (FIGS. 13F, 13G, 13H) of the weave 130; and
  planes 9, 10, 11, i.e. 1, 2, 3, (since 9, 10, 11=1, 2, 3 modulo 8) of the weave of the transition structure 150 (FIGS. 15A, 15B, 15C).

Figure 16:
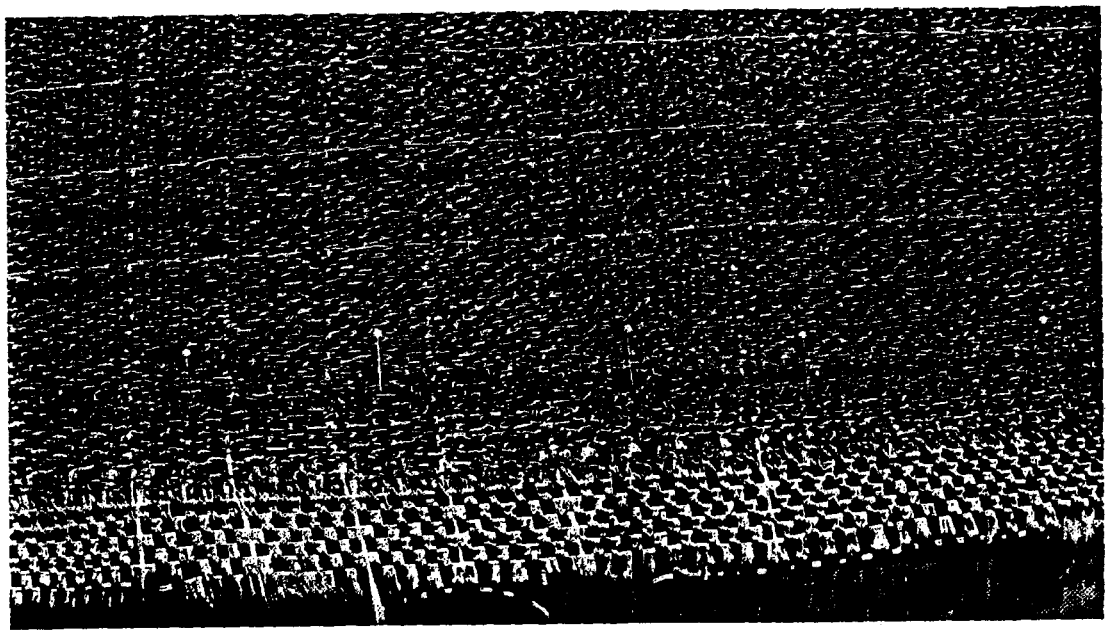
FIG. 16 is a photograph showing a portion of a fiber structure constituting another embodiment of the invention in the form of a blade preform for a turbomachine.

The photograph of FIG. 16 shows a portion of fiber structure of varying thickness that constitutes a fiber preform for a turbomachine fan blade. It can be seen that the continuity of skin weaves is ensured up to the edge BF of the preform corresponding to the trailing edge of the airfoil of the blade. The thin portion is woven in accordance with Examples 9 to 12 (FIGS. 12 to 15).

The invention claimed is:

1. A reinforcing fiber structure woven as a single piece for fabricating a composite material part, the fiber structure being at least partially formed with an internal portion or core, located between two portions adjacent to outside surfaces of the structure, or skins, the core and the skins together comprising at least three layers of weft yarns and at least three layers of warp yarns, and the fiber structure being formed by a three-dimensional weaving in its core using at least one interlock weave, and by weaving at its skin with a weave of satin type.

2. A fiber structure according to claim 1, wherein the skin weave is of multilayer type.

3. A fiber structure according to claim 1, wherein the skin weave is of two-dimensional type.

4. A fiber structure according to claim 1, wherein the core comprises a first portion formed by three-dimensional weaving with a first weave and at least one second portion situated between the first portion and the skin, the second portion being formed by three-dimensional weaving with a second weave different from the first.

5. A fiber structure according to claim 4, wherein the first and second weaves are interlock weaves.

6. A fiber structure according to claim 4, wherein one of the first and second weaves is an interlock weave and the other is a multilayer weave.

7. A fiber structure according to claim 1, wherein at least one of the warp and weft counts varies between the core and a skin.

8. A fiber structure according to claim 7 for fabricating composite material parts by CVI densification, wherein at least one of the warp and weft counts is smaller at a skin than in the core.

9. A fiber structure according to claim 1, wherein the yarns used for weaving are of caliber that varies between the core and a skin.

10. A fiber structure according to claim 1, having at least a portion of reduced thickness with two layers of weft yarns and formed by three-dimensional weaving with an interlock type weave bonding together the two weft layers and by a two-dimensional weave with satin type weave bonding together the yarns in each skin.

11. A fiber structure according to claim 1, having a reduced-thickness portion with three layers of weft yarns and formed by three-dimensional weaving with an interlock weave bonding together the three weft layers, and the central layer of weft yarns is also bonded with each of the other two layers by multilayer weaving with satin type weave.

12. A fiber structure according to claim 1, having a transition portion between a first portion and a second portion having a complete layer of weft yarns that is additional compared with the first portion, the transition portion having a partial layer of weft yarns that is additional compared with the first portion.

13. A fiber structure according to claim 12, wherein the weft yarns of the additional partial layer are disposed between two complete layers of weft yarns and are bonded thereto by weaving with an interlock weave.

14. A composite material part having fiber reinforcement densified by a resin matrix, wherein the fiber reinforcement is formed by a fiber structure according to claim 1.

15. A part according to claim 14, constituting a turbomachine blade.

16. A thermostructural composite material part having fiber reinforcement densified by a matrix, in which the fiber reinforcement is formed by a fiber structure according to claim 1.

* * * * *